United States Patent
Yamaguchi et al.

(10) Patent No.: US 9,701,853 B2
(45) Date of Patent: Jul. 11, 2017

(54) ACTINIC RAY-CURABLE OFFSET INK COMPOSITION AND PRINTED ITEM OBTAINED THEREWITH

(71) Applicants: TOYO INK SC HOLDINGS CO., LTD., Tokyo (JP); TOYO INK CO., LTD., Tokyo (JP)

(72) Inventors: Seiji Yamaguchi, Tokyo (JP); Shinsuke Tsurutani, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 0 days.

(21) Appl. No.: 15/120,112

(22) PCT Filed: Feb. 19, 2015

(86) PCT No.: PCT/JP2015/054627
§ 371 (c)(1),
(2) Date: Aug. 18, 2016

(87) PCT Pub. No.: WO2015/125867
PCT Pub. Date: Aug. 27, 2015

(65) Prior Publication Data
US 2017/0058134 A1    Mar. 2, 2017

(30) Foreign Application Priority Data

Feb. 20, 2014 (JP) ................. 2014-030937
May 26, 2014 (JP) ................. 2014-108240

(51) Int. Cl.
*C08F 2/46* (2006.01)
*C08F 2/50* (2006.01)
*C08G 61/04* (2006.01)
*C09D 11/101* (2014.01)
*C09D 11/03* (2014.01)

(52) U.S. Cl.
CPC ............ *C09D 11/101* (2013.01); *C09D 11/03* (2013.01)

(58) Field of Classification Search
USPC .......... 522/9, 8, 7, 6, 71, 189, 184, 1; 520/1
See application file for complete search history.

(56) References Cited

U.S. PATENT DOCUMENTS

2009/0098304 A1    4/2009  Stone et al.
2010/0304098 A1*  12/2010  Ohno et al. ................. 522/8
2013/0302579 A1*  11/2013  Kuge et al. ............. 428/211.1

FOREIGN PATENT DOCUMENTS

| JP | 2005-154748 | 6/2005 |
| JP | 2007-191606 | 8/2007 |
| JP | 2007-204543 | 8/2007 |
| JP | 2008-545859 | 12/2008 |
| JP | 2010-132780 | 6/2010 |
| JP | 2011-080054 | 4/2011 |
| JP | 2012-214782 | 11/2012 |
| JP | 5286859 | 9/2013 |
| WO | 2006131259 | 12/2006 |
| WO | 2009008226 | 1/2009 |

OTHER PUBLICATIONS

"International Search Report (Form PCT/ISA/210) of PCT/JP2015/054627", mailed on Mar. 17, 2015, with English translation thereof, pp. 1-4.
"Office Action of Japan Counterpart Application", issued on Aug. 26, 2014, p. 1-p. 13.
"Office Action of Japan Counterpart Application", issued on Nov. 11, 2014, p. 1-p. 7.
"International Preliminary Report on Patentability; this report contains the following items :Form PCT/IB/338, PCT/IB/373, PCT/ISA237(cover sheet), PCT/ISA237(Box No. I),PCT/ISA237(Box No. V)", mailed on Sep. 1, 2016, which is English translation of "Written Opinion of the International Searching Authority", p. 1-p. 6.

* cited by examiner

*Primary Examiner* — Jessica E Whiteley
(74) *Attorney, Agent, or Firm* — Jianq Chyun IP Office

(57) ABSTRACT

Shown is an actinic ray-curable offset ink composition for foodstuff and pharmaceutical packaging which maintains superior curability without using a photosensitizer, which despite contributing to better curability (high productivity) tends to suffer from significant outward migration. The ink composition also suppresses outward migration of the monomers and photopolymerization initiators, and exhibits favorable adhesion to substrates.

7 Claims, 1 Drawing Sheet

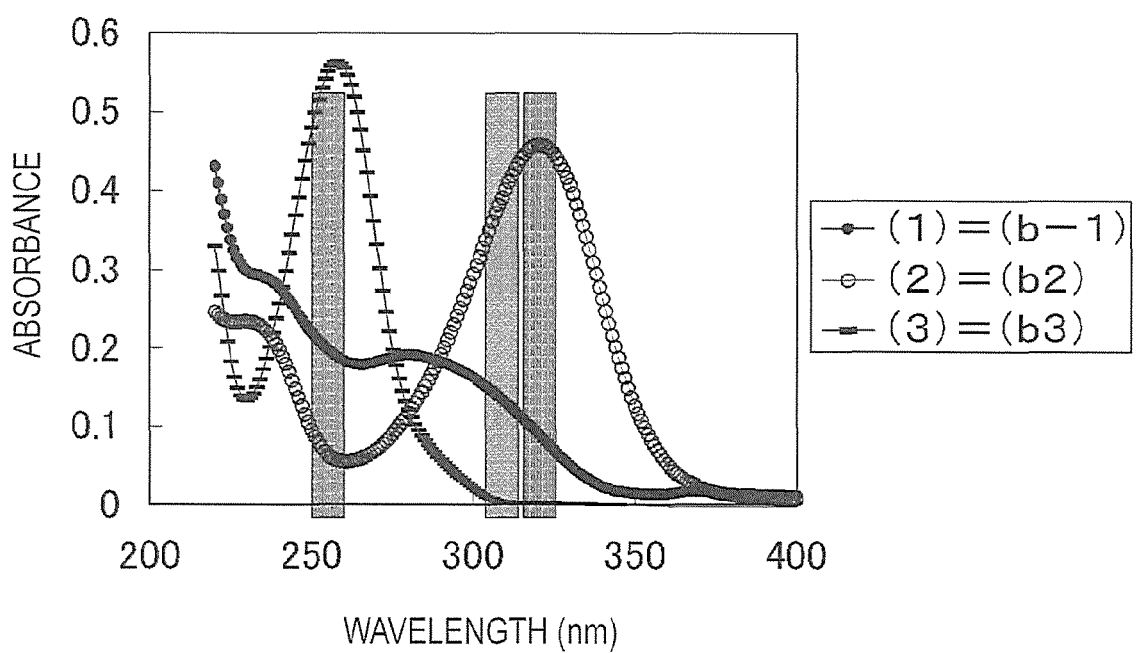

ACTINIC RAY-CURABLE OFFSET INK COMPOSITION AND PRINTED ITEM OBTAINED THEREWITH

CROSS-REFERENCE TO RELATED APPLICATION

This application is a 371 application of the international PCT application serial no. PCT/JP2015/054627, filed on Feb. 19, 2015, which claims the priority benefit of Japan application no. 2014-030937, filed on Feb. 20, 2014, and Japan application no. 2014-108240, filed on May 26, 2014. The entirety of each of the above-mentioned patent applications is hereby incorporated by reference herein and made a part of this specification.

TECHNICAL FIELD

The present invention relates to an actinic ray-curable ink composition and a printed item obtained by printing the composition. The present invention relates to an actinic ray-curable offset ink composition for use on packaging materials for foodstuffs and pharmaceuticals which achieves good suppression of outward migration from the printed item for both the (meth)acrylate monomers and the photopolymerization initiators that represent the main components of the ink, and relates particularly to an actinic ray-curable offset ink composition that exhibits a combination of good curability and outward migration suppression without using a photosensitizer, which despite contributing to better curability (high productivity) tends to suffer from significant outward migration, and also exhibits favorable substrate adhesion.

BACKGROUND ART

Conventionally, a variety of printing methods such as lithographic printing (including normal lithography which uses a dampening solution and waterless lithography which uses no dampening solution), relief printing, intaglio printing and stencil printing are used to obtain all manner of printed items, including printed items on cardboard and various types of books, printed packaging materials such as form printed items, various plastic printed items, printed items for stickers and labels, and metal printed items, and inks best suited to each of these printing methods are used in the printing process. One such ink that is well known is the actinic ray-curable ink.

Actinic ray-curable inks include an unsaturated compound having actinic ray curability such as an acrylate ester compound as an ink component, and cure instantaneously upon irradiation with actinic rays, with a three dimensional crosslinking reaction of the unsaturated compound forming a tough coating film. In addition, because of this curability, post processing can be performed immediately following printing, resulting in improved productivity compared with conventional oxidative polymerization type inks. Further, actinic ray-curable inks also tend to be used widely in the field of printing for packaging, which requires good rub resistance in order to protect the design aesthetics. In such cases, lithographic printing is widely used, as it exhibits excellent print quality in addition to this improved productivity and reduced cost.

Furthermore, within packaging printing applications, the majority of applications relate to the field of foodstuff packaging. In this particular field, in addition to improvements in the print quality relating to the design aesthetics of the packaging, recent enhanced awareness of safety issues has resulted in increased discussion relating to the migration of raw materials from the coating composition into the food contents. This increased discussion of the migration of coating composition raw materials has naturally tended to be more pronounced in the European and American markets where safety awareness has generally been at a higher level, and Switzerland has recently enacted the world's first legal regulation relating to printing inks for foodstuff packaging (Swiss Ordinance (RS817.023.21). The effect of this ordinance has spread widely, not only throughout the whole of Europe, but also within other developed nations such as Japan, and other developing nations.

The content of this ordinance prohibits the use of substances having a certain degree of toxicity or for which concern has been reported in relation to environmental hormones as ink raw materials, and strictly restricts the amount of migration of the various raw materials used into the food contents. The amounts permitted by these migration restrictions are extremely small, in the order of ppb, making the design of inks extremely demanding. Moreover, large foodstuff manufacturers and foodstuff packaging manufacturers across the entire global market have now started adopting regulations of a similar standard to Swiss Ordinance (RS817.023.21) as their own internal regulations, meaning this level of low migration is now being demanded for all inks used for foodstuff packaging.

As illustrated by technology including Patent Documents 1, 2 and 3, research is being conducted from various viewpoints with the aim of achieving low migration, low odor or low bleeding characteristics. In Patent Document 1, by performing chemical bonding between a photopolymerization initiator or a sensitizer and a polyester resin, the amount used of a high-migration photopolymerization initiator or sensitizer can be reduced, and therefore migration, elution or evaporation of the photopolymerization initiator or sensitizer following the curing reaction can be reduced. Further, in Patent Document 2, reductions in the odor and migration are achieved by appropriate selection of the photopolymerization initiator in an actinic ray-curable ink. Moreover, in Patent Document 3, by using a novel photopolymerization initiator based on a thioxanthone backbone that is used as a sensitizer, a combination of superior curability and low bleeding characteristics is achieved.

However, if the test conditions used in the evaluations of low migration, low odor and low bleeding in Patent Documents 1 to 3 are analyzed, then in Patent Document 1, a film substrate is placed on the printed item, compression is performed at a temperature of 70° C. and a pressure of 100 kgf/cm$^2$ for 5 hours, and the amounts of unreacted initiator and sensitizer that have migrated into the film are measured using a UV-VIS absorption spectrophotometer, whereas in Patent Document 2, in a similar manner, a film substrate is placed on the printed item, and following standing for 24 hours at a temperature of 60° C. under a pressure of 100 kg/cm$^2$, the film is immersed in distilled water (temperature: 25° C., 24 hours), and the amounts of unreacted initiator and sensitizer, or unreacted monomers and oligomers, are measured using a UV-VIS absorption spectrophotometer. Further, in Patent Document 3, an unprinted white sheet of paper is placed on the printed item, and following standing for 24 hours at a temperature of 60° C. under a pressure of 15 g/cm$^2$, the amounts of the initiator and sensitizer are measured.

Patent Documents 1 and 3 use measurement of the ultraviolet absorption spectrum of the film, and therefore quantitative measurement at the ppb order is difficult, and in Patent Document 3, the compression conditions and the standing time are slight. Moreover, in Patent Document 2, the film into which migration of the ink raw materials from the printed item is assumed to have occurred is extracted using distilled water, but in the contents of most regulations including Swiss Ordinance (RS817.023.21), the use of a high-concentration alcohol aqueous solution is deemed the most suitable for replicating the actual contents of foodstuff packaging. Moreover, the temperature and standing time conditions used in Patent Document 3 do not fully satisfy market demands. In addition, the majority of radical polymerizable monomers and oligomers used in actinic ray-curable inks lack a light absorption wavelength, meaning detection of these compounds using the type of UV-VIS absorption spectrophotometer described in Patent Document 2 is impossible.

Patent Documents 1 and 3 relate mainly to a reduction in the migration of the photopolymerization initiator or the sensitizer, and make no mention of a reduction in the migration of the radical polymerizable monomer or oligomer, which is the other main component in the crosslinking reaction.

Further, although methods such as those in Patent Documents 1 and 3 in which the molecular weight of the photopolymerization initiator or the sensitizer is increased are widely used as techniques for achieving low migration, low odor and low bleeding characteristics for the photopolymerization initiator or the sensitizer, the number of reactive groups per unit of molecular weight decreases, and the resulting problem of a deterioration in the curability has yet to be addressed.

Actinic ray-curable inks often use a combination of a photopolymerization initiator and a sensitizer to prevent any deterioration in the curability caused by the light-blocking effects of the organic or inorganic pigments contained within the ink. Patent Documents 1 and 2 both include a sensitizer as an essential component, but although the thioxanthone compounds used as representative examples of the sensitizer and the amino compounds disclosed in Patent Document 2 provide an improvement in the curability, they exhibit significant outward migration characteristics, meaning that when they are used as raw materials in ink compositions for printing foodstuff packaging, the probability of migration into the food contents is high. In Patent Document 3, because the basic backbone of the novel photopolymerization initiator is a thioxanthone structure, there is an inherent risk of residues such as unreacted matter.

In this manner, as enhanced awareness of safety issues relating to foodstuff and pharmnnaceutical packaging spreads around the world, there is growing demand for actinic ray-curable ink compositions that satisfy the standards of regulation such as Swiss Ordinance (RS817.023.21), but test conditions that fully recognize the actual production and storage states of products have yet to be formulated and established. Further, actinic ray-curable ink compositions that are capable of maintaining high levels of curability (high productivity) without using a sensitizer are also becoming increasingly necessary.

PRIOR ART DOCUMENTS

Patent Documents

Patent Document 1: JP 2005-154748 A
Patent Document 2: JP 2007-204543 A
Patent Document 3: JP 5,286,859 B

DISCLOSURE OF INVENTION

Problems Invention Aims to Solve

By maintaining superior curability without using a photosensitizer, which despite contributing to better curability (high productivity) tends to suffer from significant outward migration, the present invention provides an actinic ray-curable offset ink composition for foodstuff and pharmaceutical packaging which suppresses outward migration from the printed item of the (meth)acrylate monomer and the photopolymerization initiator that represent the main ink components, while exhibiting favorable substrate adhesion.

Means for Solution of the Problems

As a result of intensive research, the inventors of the present invention discovered that in an actinic ray-curable offset ink comprising a photopolymerization initiator and an unsaturated compound with actinic ray curability such as an acrylate ester compound, by limiting the (meth)acrylate monomer to compounds that satisfy the conditions of having 3 or more acrylate functional groups per molecule and having a weight-average molecular weight of 400 to 2,000, and also restricting the photopolymerization initiator in the manner described below, excellent curability could be obtained by ultraviolet irradiation at a wavelength of 200 to 420 nm without using a sensitizer, and favorable suppression of outward migration could also be achieved.

(1) The photopolymerization initiator (B) comprises an acylphosphine oxide compound (b1), an α-aminoalkylphenone (b2), and an α-hydroxyalkylphenone (b3).

(2) The molar extinction coefficient of the α-aminoalkylphenone (b2) is at least 5,000 (l/mol·cm) within the light wavelength region from 350 to 400 nm and at least 40,000 (l/mol·cm) within the light wavelength region from 300 to 350 nm, and the molar extinction coefficient of the α-hydroxyalkylphenone (b3) is at least 40,000 (l/mol·cm) within the light wavelength region from 250 to 300 nm.

(3) The photopolymerization initiator (B) is composed only of compounds having a weight-average molecular weight of 300 to 2,000.

(4) The total weight of the actinic ray-curable offset ink composition contains not more than 5% by weight of the acylphosphine oxide compound (b1).

Effects of the Invention

The present invention relates to an actinic ray-curable offset ink composition in which by maintaining superior curability without using a photosensitizer, which despite contributing to better curability (high productivity) tends to suffer from significant outward migration, outward migration from the printed item of the (meth)acrylate monomer and the photopolymerization initiator that represent the main ink components can be suppressed, while maintaining high productivity for the production of printed packaging items using offset printing.

Moreover, the invention also relates to an actinic ray-curable offset ink composition which, in light of the increased awareness of safety issues relating to foodstuff and pharmaceutical packaging that continues to spread across the entire global market, has safety of a standard equal to or exceeding Swiss Ordinance (RS817.023.21), the world's first legal regulation relating to printing inks for foodstuff packaging, and relates to a multi-layer printed item using the actinic ray-curable offset ink composition.

BRIEF DESCRIPTION OF THE DRAWINGS

FIG. 1 is a diagram illustrating the results of measuring the ultraviolet absorption spectra of three types of the photopolymerization initiator (B), and also illustrating the wavelength regions (254 nm, 303 nm, 313 nm) in which a high-pressure mercury lamp and a metal halide lamp irradiate particularly efficiently.

EMBODIMENTS FOR CARRYING OUT THE INVENTION

The present invention relates to an actinic ray-curable offset ink composition comprising:
a (meth)acrylate compound (A),
a photopolymerization initiator (B), and
a pigment (C), and
satisfying conditions (1) to (8) described below.

(1) The actinic ray-curable offset ink composition contains no photosensitizer.

(2) The photopolymerization initiator (B) comprises an acylphosphine oxide compound (b1), an α-aminoalkylphenone (b2), and an α-hydroxyalkylphenone (b3).

(3) The molar extinction coefficient of the α-aminoalkylphenone (b2) is at least 5,000 (l/mol·cm) within the light wavelength region from 350 to 400 nm and at least 40,000 (l/mol·cm) within the light wavelength region from 300 to 350 nm, and the molar extinction coefficient of the α-hydroxyalkylphenone (b3) is at least 40,000 (l/mol·cm) within the light wavelength region from 250 to 300 nm.

(4) The photopolymerization initiator (B) is composed only of compounds having a weight-average molecular weight of 300 to 2,000.

(5) The total weight of the actinic ray-curable offset ink composition contains not more than 5% by weight of the acylphosphine oxide compound (b1).

(6) The (meth)acrylate compound (A) is composed only of compounds having 3 or more acrylate functional groups per molecule and having a weight-average molecular weight of 400 to 2,000.

(7) The (meth)acrylate compound (A) comprises at least one compound (a1) selected from the group consisting of:
ditrimethylolpropane tetra (or tri) acrylate,
ethylene oxide-modified pentaerythritol tetra (or tri) acrylate,
propylene oxide-modified pentaerythritol tetra (or tri) acrylate,
ethylene oxide-modified trimethylolpropane triacrylate,
propylene oxide-modified trimethylolpropane triacrylate, and
propylene oxide-modified glycerol triacrylate.

(8) The (meth)acrylate compound (A) comprises dipentaelythritol hexaacrylate and/or dipentaerythritol pentaacrylate (a2).

The actinic ray-curable offset ink composition of the present invention is designed so that, following printing, efficient curing can be achieved even without including a photosensitizer, by irradiation with ultraviolet rays from a high-pressure mercury lamp and/or a metal halide lamp that emits ultraviolet rays of 200 to 420 nm.

In the present invention, the term "actinic" describes radiation having the energy necessary to excite the starting materials for the curing reaction from a ground state to a transition state, and the actinic rays described in the present invention refer to ultraviolet rays or an electron beam.

In the present invention, in the units (l/mol·cm) for the molar extinction coefficient, the "l" represents liter, indicating a unit of volume.

The photocuring method for the actinic ray-curable offset ink composition can use a typical light source that emits ultraviolet rays such as a high-pressure mercury lamp or a metal halide lamp, except for curing methods that use LED light sources. Because ultraviolet ray-emitting light sources such as mercury lamps and metal halide lamps have a wide emission wavelength band, it is necessary that the photopolymerization initiator used is able to efficiently utilize wavelengths within the ultraviolet region from 200 to 420 nm for the curing reaction, and the majority of actinic ray-curable offset ink compositions use a combination of a photopolymerization initiator and a sensitizer. In those cases where an efficient photopolymerization reaction is to be maintained without using a sensitizer, which tends to undergo significant outward migration, it is necessary to ensure there is no significant degradation in the curability, by using a compound which has a molar extinction coefficient that exceeds a certain level across a broad wavelength range, and which also has a photobleaching effect that promotes internal curing. The molar extinction coefficients of the main photopolymerization initiators (B) related to the present invention are shown in Table 1.

TABLE 1

Molar extinction coefficients of main photopolymerization initiators at various wavelengths

| | Classification | | Chemical name | Weight-average molecular weight | Molar extinction coefficient ($\times 10^2$) (l/mol · cm) | | | | |
|---|---|---|---|---|---|---|---|---|---|
| | | | | | 254 nm | 302 nm | 313 nm | 365 nm | 405 nm |
| Photo-polymer-ization initiator (B) | Acyl-phosphine oxide compound b1 | b1-1 | bis(2,4,6-trimethyl-benzoyl)-phenyl-phosphine oxide | 419 | 195.3 | 182.3 | 150.9 | 23.1 | 9.0 |
| | | | 2,4,6-trimethyl-benzoyl-diphenyl-phosphine oxide | 348 | 51.0 | 30.0 | 20.7 | 4.7 | 1.7 |
| | α-amino-alkylphenone compound | b2 | 2-(dimethylamino)-1-(4-morpholino-phenyl)-2-benzyl-1-butanone | 367 | 74.7 | 358.7 | 485.4 | 78.6 | 2.8 |
| | | | 2-methyl-1-[4-(methylthio)phenyl]-2-morpholino-propan-1-one | 279 | 39.4 | 606.3 | 564.1 | 4.7 | — |

TABLE 1-continued

Molar extinction coefficients of main photopolymerization initiators at various wavelengths

| Classification | | Chemical name | Weight-average molecular weight | Molar extinction coefficient ($\times 10^2$) (1/mol · cm) | | | | |
|---|---|---|---|---|---|---|---|---|
| | | | | 254 nm | 302 nm | 313 nm | 365 nm | 405 nm |
| α-hydroxy-alkylphenone compound | b3 | oligo{2-hydroxy-2-methyl-1-[4-(1-methylvinyl)phenyl]propanone} | 409 | 734.0 | 11.2 | 8.4 | 1.1 | 0.1 |
| | | 1-hydroxycyclohexyl phenyl ketone | 204 | 331.7 | 5.8 | 4.3 | 0.9 | — |

In the present invention, examples of the photopolymerization initiator (B) include the acylphosphine oxide compound (b1), the α-aminoalkylphenone (b2) and the α-hydroxyalkylphenone (b3). In the present invention, in order to achieve a combination of superior curability and good suppression of outward migration, the photopolymerization initiator (B) preferably includes all three components, namely the acylphosphine oxide compound (b1), the α-aminoalkylphenone (b2) and the α-hydroxyalkylphenone (b3).

The acylphosphine oxide compound (b1) is a photocleavage initiator, and specific examples include 2,4,6-trimethylbenzoyl-diphenylphosphine oxide and 2,4,6-trimethylbenzoyl-diphenylethoxyphosphine oxide. These compounds may be used individually or combined.

Of the total weight of the actinic ray-curable offset ink composition, the amount of the acylphosphine oxide compound (b1) is preferably not more than 5% by weight. If the amount exceeds 5% by weight, then the low migration characteristics tend to deteriorate.

The acylphosphine oxide compound (b1) preferably includes bis(2,4,6-trimethylbenzoyl)-phenylphosphine oxide (b1-1).

Compared with the aforementioned 2,4,6-trimethylbenzoyl-diphenylphosphine oxide and 2,4,6-trimethylbenzoyl-diphenylethoxyphosphine oxide, bis(2,4,6-trimethylbenzoyl)-phenylphosphine oxide (b1-1) has twice as many cleavage sites that generate radicals upon photoexcitation, meaning more favorable curability can be achieved.

In the present invention, the α-aminoalkylphenone (b2) is a photocleavage initiator, and specific examples include 2-(dimethylamino)-1-(4-morpholinophenyl)-2-benzyl-1-butanone and 2-(dimethylamino)-2-(4-methylbenzyl)-1-(4-morpholinophenyl)-butan-1-one. These compounds may be used individually or combined. Of the total weight of the actinic ray-curable offset ink composition, the amount of the α-aminoalkylphenone (b2) is preferably not more than 5% by weight. If the amount exceeds 5% by weight, then the ink tends to undergo excessive curing, and the resulting curing shrinkage tends to cause a deterioration in the adhesion.

In the present invention, the α-hydroxyalkylphenone (b3) is a photocleavage initiator, and specific examples include 2-hydroxy-1-[4-[4-(2-hydroxy-2-methyl-propionyl)-benzyl]-phenyl]-2-methylpropan-1-one and oligo {2-hydroxy-2-methyl-1-[4-(1-methylvinyl)phenyl]propanone}. These compounds may be used individually or combined. Because the α-hydroxyalkylphenone (b3) has a hydroxyl group within the chemical structure, it exhibits favorable solubility in the dipentaerythritol hexaacrylate and/or dipentaerythritol pentaacrylate (a2) that is used as another component of the present invention. It is thought that this component also improves the solubility of the acylphosphine oxide compound (b1) and the α-aminoalkylphenone (b2) in the dipentaerythritol hexaacrylate and/or dipentaerythritol pentaacrylate (a2), thereby markedly improving the curability. Of the total weight of the actinic ray-curable offset ink composition, the amount of the α-hydroxyalkylphenone (b3) is preferably not more than 5% by weight. If the amount exceeds 5% by weight, then the ink tends to undergo excessive curing, and the resulting curing shrinkage tends to cause a deterioration in the adhesion.

In the present invention, the weight-average molecular weight of the photopolymerization initiator (B) is preferably at least 300 but not more than 2,000. If the weight-average molecular weight is less than 300, then the low migration characteristics deteriorate, whereas if the weight-average molecular weight exceeds 2,000, then the curability tends to be unfavorable. In the present invention, the photopolymerization initiator (B) is preferably composed only of compounds having a weight-average molecular weight of 300 to 2,000, but this does not exclude cases in which a photopolymerization initiator having a weight-average molecular weight of less than 300 or exceeding 2,000 is included in a trace amount that is not detectable in the migration test described below.

Moreover, in the present invention, the expression "contains no photosensitizer" does not exclude cases in which a photosensitizer described below is included in a trace amount that is not detectable in the migration test described below.

In the present invention, photosensitizers refer to thioxanthone compounds and amino compounds. Specific examples of the thioxanthone compounds include 2,4-diethylthioxanthone, 2,4-dimethylthioxanthone, 2,4-diisopropylthioxanthone, 2-isopropylthioxanthone, 4-isopropylthioxanthone, 2,4-dichlorothioxanthone, 2-chlorothioxanthone, 1-chloro-4-propoxythioxanthone, 2-hydroxy-3-(3,4-dimethyl-9-oxo-9H-thioxanthon-2-yloxy)-N,N,N-trimethyl-1-propanamine hydrochloride. Further, specific examples of the amino compounds include N,N-dimethylaniline, N,N-diethylaniline, N,N-dimethyl-p-toluidine, ethyl 4-(dimethylamino) benzoate, N,N-dihydroxyethylaniline, triethylamine, and N,N-dimethylhexylamine.

In the present invention, a light source that emits ultraviolet rays such as a high-pressure mercury lamp or a metal halide lamp can be used for curing the actinic ray-curable offset ink composition. A high-pressure mercury lamp is a lamp in which high-purity mercury and a small amount of a rare gas are used to fill an arc tube made of quartz glass, and this lamp has a main wavelength at 365 nm, but also efficiently emits ultraviolet rays at wavelengths of 254 nm, 303 nm and 313 nm. Further, a metal halide lamp is a lamp in which, in addition to mercury, a metal is also included in halide form inside the arc tube. Compared with a mercury lamp, a metal halide lamp emits an ultraviolet spectrum that spans a broad range from 200 nm to 450 nm, and emits ultraviolet rays particularly efficiently at 313 unm and at longer wavelengths of 360 nm or greater.

FIG. 1 illustrates the results of measuring the ultraviolet absorption spectra of the three types of the photopolymerization initiator (B) described below:

(1) bis(2,4,6-trimethylbenzoyl)-phenylphosphine oxide (b1-1) as the acylphosphine oxide compound (b1), (2) 2-(dimethylamino)-1-(4-morpholinophenyl)-2-benzyl-1-butanone as the α-aminoalkylphenone (b2), and (3) oligo {2-hydroxy-2-methyl-1-[4-(1-methylvinyl)phenyl]propanone} as the α-hydroxyalkylphenone (b3).

Measurements of absorption spectra were performed by dissolving each photopolymerization initiator in acetonitrile to prepare a solution with a concentration of 0.001% by weight, and then using an ultraviolet-visible-near infrared spectrophotometer (UV-3600) manufactured by Shimadzu Corporation to measure the absorption under conditions including a scan wavelength range of 220 to 400 nm and a slit width of 5 nm.

Further, even when using 2-(dimethylamino)-2-(4-methylbenzyl)-1-(4-morpholinophenyl)-butan-1-one as the α-aminoalkylphenone (b2) or 2-hydroxy-1-[4-[4-(2-hydroxy-2-methyl-propionyl)-benzyl]-phenyl]-2-methylpropan-1-one as the α-hydroxyalkylphenone (b3), the similarity in the chemical structures means that similar results to those shown in FIG. 1 can be obtained.

Moreover, FIG. 1 also shows the wavelength regions (254 nm, 303 nm, 313 nm) in which a high-pressure mercury lamp and a metal halide lamp irradiate particularly efficiently. Ultraviolet rays of 254 nm cause efficient reaction of the α-hydroxyalkylphenone (b3), whereas ultraviolet rays of 303 nm or 313 nm cause efficient reaction of the α-aminoalkylphenone (b2), and because the acylphosphine oxide compound (b1) exhibits a broad wavelength absorption region and also has a photobleaching effect that promotes internal curing, superior curability of a similar level to that mentioned above can be achieved without using a photosensitizer.

In the present invention, the (meth)acrylate monomer preferably has 3 or more acrylate functional groups per molecule, and has a weight-average molecular weight of 400 to 2,000. If the number of acrylate functional groups per molecule is less than 3, then the low migration characteristics deteriorate. If the weight-average molecular weight is less than 400, then the low migration characteristics deteriorate, whereas if the weight-average molecular weight exceeds 2,000, the curability deteriorates. In the present invention, the (meth)acrylate compound (A) is preferably composed only of compounds having 3 or more acrylate functional groups per molecule and having a weight-average molecular weight of 400 to 2,000.

Specific examples of the (meth)acrylate compound (A) having 3 or more acrylate functional groups per molecule include trimethylolpropane tricaprolactonate tri(meth)acrylate, pentaerythritol tetracaprolactonate tetra(meta)acrylate, ditrimethylolpropane tri(meth)acrylate, ditrimethylolpropane tetra(meth)acrylate, ditrimethylolpropane tetracaprolactonate tetra(meth)acrylate, ditrimethylolethane tetra(meth)acrylate, ditrimethylolbutane tetra(meth)acrylate, ditrimethylolhexane tetra(meth)acrylate, ditrimethyloloctane tetra(meth)acrylate, dipentaerythritol penta(meth)acrylate, dipentaerythritol hexa(meth)acrylate, tripentaerythritol hexa(meth)acrylate, tripentaerythritol hepta(meth)acrylate, and tripentaerythritol octa(meth)acrylate, although this is not an exhaustive list. Among these, if consideration is given to curability and market versatility, then the selection of ditrimethylolpropane tri(meth)acrylate, ditrimethylolpropane tetraacrylate, dipentaerythritol pentaacrylate or dipentaerythritol hexaacrylate is preferable.

In the present invention, from the viewpoint of curability, the inclusion of dipentaerythritol hexaacrylate and/or dipentaerythritol pentaacrylate (a2), each of which has a large number of functional groups, is preferable. Of the total weight of the actinic ray-curable offset ink composition, the amount of the dipentaerythritol hexaacrylate and/or dipentaerythritol pentaacrylate (a2) preferably exceeds 0% by weight but is not more than 50% by weight. If this amount is 0% by weight, then the curability tends to deteriorate, whereas if the amount exceeds 50% by weight, then the ink tends to undergo excessive curing, and the resulting curing shrinkage tends to cause a deterioration in the adhesion.

Other examples of the (meth)acrylate compound (A) of the present invention include alkylene oxide adduct (meth)acrylates of aliphatic alcohol compounds. Examples of these aliphatic alcohol alkylene oxide adduct (meth)acrylate monomers include mono or poly (1 to 10) (meth)acrylates of mono or poly (1 to 20) alkylene (C2 to C20) oxide adducts (wherein examples of the alkylene oxide include ethylene oxide, propylene oxide, butylene oxide, pentylene oxide and hexylene oxide, and this definition also applies below) of aliphatic alcohol compounds.

Among these alkylene oxide adduct (meth)acrylates, specific examples of compounds having 3 or more acrylate functional groups per molecule include:

glycerol poly (2 to 20) alkylene (C3 to C20) oxide adduct tri(meth)acrylate, trimethylolpropane poly (2 to 20) alkylene (C2 to C20) oxide adduct tri(meth)acrylate, trimethylolethane poly (2 to 20) alkylene (C3 to C20) oxide adduct tri(meth)acrylate, trimethylolhexane poly (2 to 20) alkylene (C2 to C20) oxide adduct tri(meth)acrylate, trimethyloloctane poly (2 to 20) alkylene (C2 to C20) oxide adduct tri(meth)acrylate, pentaerythritol poly (2 to 20) alkylene (C2 to C20) oxide adduct tri(meth)acrylate, pentaerythritol poly (2 to 20) alkylene (C2 to C20) oxide adduct tetra(meth)acrylate, ditrimethylolpropane poly (2 to 20) alkylene (C2 to C20) oxide adduct tetra(meth)acrylate, ditrimethylolethane poly (2 to 20) alkylene (C2 to C20) oxide adduct tetra(meth)acrylate, ditrimethylolbutane poly (2 to 20) alkylene (C2 to C20) oxide adduct tetra(meth)acrylate, ditrimethylolhexane poly (2 to 20) alkylene (C2 to C20) oxide adduct tetra(meth)acrylate, ditrimethyloloctane poly (2 to 20) alkylene (C2 to C20) oxide adduct tetra(meth)acrylate, dipentaerythritol poly (5 to 20) alkylene (C2 to C20) oxide adduct penta(meth)acrylate, dipentaerythritol poly (2 to 20) alkylene (C2 to C20) oxide adduct hexa(meth)acrylate, tripentaerythritol poly (2 to 20) alkylene (C2 to C20) oxide adduct hexa(meth)acrylate, tripentaerythritol poly (2 to 20) alkylene (C2 to C20) oxide adduct hepta(meth)acrylate, and tripentaerythritol poly (2 to 20) alkylene (C2 to C20) oxide adduct octa(meth)acrylate, although this is not an exhaustive list.

Among the various alkylene oxide adduct (meth)acrylates, if consideration is given to curability and market versatility, then the selection of an ethylene oxide adduct (2 to 6) trimethylolpropane triacrylate, propylene oxide adduct (2 to 6) trimethylolpropane triacrylate, ethylene oxide adduct (3 to 8) pentaerythritol tetra (or tri) acrylate, propylene oxide adduct (3 to 8) pentaerythritol tetra (or tri) acrylate, or propylene oxide adduct (2 to 6) glycerol triacrylate is preferable.

In the present invention, it is preferable to include at least one compound (a1) selected from the group consisting of:
  ditrimethylolpropane tetra (or tri) acrylate,
  ethylene oxide-modified pentaerythritol tetra (or tri) acrylate,
  propylene oxide-modified pentaerythritol tetra (or tri) acrylate,
  ethylene oxide-modified trimethylolpropane triacrylate,
  propylene oxide-modified trimethylolpropane triacrylate, and
  propylene oxide-modified glycerol triacrylate.

If one of these compounds is not included, then achieving an appropriate ink viscosity may become difficult. Moreover, the curability and the adhesion tend to deteriorate.

In the present invention, in terms of the printability and the like, resins and pigments may also be included.

Specific examples of the resins include thermosetting and thermoplastic resins, wherein the weight-average molecular weight of the resin is preferably from 1,000 to 1,000,000, and more preferably from 10,000 to 100,000. Examples of the resins include polyesters, polyvinyl chlorides, poly(meth)acrylate esters, epoxy resins, polyurethane resins, petroleum (based) resins, cellulose derivatives (such as ethyl cellulose, cellulose acetate and nitrocellulose), vinyl chloride-vinyl acetate copolymers, polyamide resins, polyvinyl acetal resins, diallyl phthalate resins, and synthetic rubbers such as butadiene-acrylonitrile copolymers. Either one, or two or more, of these resins may be used. The resin used in the present invention preferably exhibits solubility in the ethylenic double bond-containing compounds, and particularly monomers or oligomers having a molecular weight of 100 to 6,000, which are contained in the actinic ray-curable offset ink composition. Solubility of the resin means that when 50 g of each of the resin being used and dipentaerythritol hexaacrylate are placed in a container, heated at 100° C. to achieve dissolution, and then left to stand at 25° C. for one day, no new resin precipitation or cloudiness develops.

Inorganic pigments and organic pigments may be used as the pigment. Any of various conventional pigments may be used, and specific examples of the inorganic pigments include chrome yellow, zinc yellow, Prussian blue, barium sulfate, cadmium red, titanium oxide, zinc oxide, red iron oxide, alumina white, calcium carbonate, ultramarine, carbon black, graphite, aluminum powder and red oxide, whereas examples of the organic pigments include soluble azo pigments such as β-naphthol-based, β-oxynaphthoic acid-based, β-oxynaphthoic acid anilide-based, acetoacetanilide-based and pyrazolone-based pigments, insoluble azo pigments such as β-naphthol-based, β-oxynaphthoic acid anilide-based, acetoacetanilide-based monoazo, acetoacetanilide-based disazo and pyrazolone-based pigments, phthalocyanine-based pigments such as copper phthalocyanine blue, halogenated (chlorinated or brominated) copper phthalocyanine blue, sulfonated copper phthalocyanine blue and metal-free phthalocyanine pigments, and polycyclic pigments and heterocyclic pigments such as quinacridone-based, dioxazine-based, threne-based (such as pyranthrone, anthanthrone, indanthrone, anthrapyrimidine, flavanthrone, thioindigo-based, anthraquinone-based, perinone-based and perylene-based pigments), isoindolinone-based, metal complex-based and quinophthalone-based pigments. Using a pigment such as carbon black or a phthalocyanine-based pigment that inhibits the transmittance of ultraviolet rays makes the composition of the present invention even more effective.

In the actinic ray-curable offset ink composition of the present invention, if no pigment is included as a colorant, then a transparent OP varnish can be obtained, whereas if a pigment such as those mentioned above is included, then a colored printing ink such as a yellow, red, cyan or black ink can be obtained.

Moreover, other additives such as those described below may also be used in the printing ink as required.

Examples of such additives include additives used for imparting rub resistance, anti-blocking properties, slipperiness and scratch prevention, and specific examples include natural waxes such as carnauba wax, Japan wax, lanolin, montan wax, paraffin wax and microcrystalline wax, and synthetic waxes such as Fisher-Tropsch wax, polyethylene wax, polypropylene wax, polytetrafluoroethylene wax, polyamide wax and silicone compounds.

Examples of other additives for imparting storage stability to the ink include polymerization inhibitors such as (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-tert-butyl-p-benzoquinone, dithiobenzoyl disulfide, picric acid, cupferron, aluminum N-nitrosophenylhydroxylamine, N-(3-oxyanilino-1,3-dimethylbutylidene)aniline oxide, dibutylcresol, cyclohexanone oxime cresol, guaiacol, o-isopropylphenol, butyraldoxime, methyl ethyl ketoxime and cyclohexanone oxime.

In addition, other additives such as ultraviolet absorbers, infrared absorbers and antibacterial agents may also be added depending on the required performance.

Next is a description of the use of the present invention as a printing ink composition. The total weight of the actinic ray-curable offset ink composition preferably contains 1 to 60% by weight of a pigment, 15 to 50% by weight of a resin, 10 to 70% by weight of the (meth)acrylate compound (A), 0.01 to 1% by weight of a radical polymerization inhibitor, 0.1 to 30% by weight of the actinic ray photopolymerization initiator, and 0 to 10% by weight of other additives. In particular, from the viewpoint of the curability, the blend ratio between the pigment, the (meth)acrylate compound (A) and the actinic ray photopolymerization initiator preferably satisfies the ranges mentioned above. On the other hand, from the viewpoint of suppressing migration, the amount of the actinic ray photopolymerization initiator is preferably from 0.3 to 15% by weight.

Accordingly, an example of a preferred composition for the actinic ray-curable offset ink composition of the present invention comprises, relative to the total weight of the ink:
  (1) 0.1 to 5% by weight of the acylphosphine oxide compound (b1),
  (2) 0.1 to 5% by weight of the α-aminoalkylphenone (b2),
  (3) 0.1 to 5% by weight of the α-hydroxyalkylphenone (b3),
  (6) 1 to 70% by weight of the (meth)acrylate compound (A),
  (7) 15 to 50% by weight of a resin,
  (8) 1 to 60% by weight of a pigment, and
  (9) 0 to 10% by weight of other additives.

Production of the printing ink composition may be achieved using the same methods as those used for conventional ultraviolet-curable inks, and for example, the composition may be produced at a temperature within a range from room temperature to 100° C., by using a kneading, mixing and regulating device such as a kneader, three-roll mill, attritor, sand mill or gate mixer to mix and combine the ink composition components such as the aforementioned pigment, resin, acrylate monomer or oligomer, polymerization inhibitor, photopolymerization initiator and other additives.

Weight-average molecular weights were measured using a gel permeation chromatography apparatus (HLC8020) manufactured by Tosoh Corporation, using tetrahydrofuran as a solvent and polystyrenes as the calibration curve standard samples.

EXAMPLES

The present invention is described below in further detail using a series of examples, but the present invention is in no way limited by these examples. In the examples, "parts" and "%" represents "parts by weight" and "% by weight" respectively.

<Preparation of Varnish 1>

Prior to producing an actinic ray-curable offset ink, a varnish 1 was produced. The varnish 1 was produced by combining a diallyl phthalate resin, dipentaerythritol hexaacrylate and hydroquinone in a ratio of 40/60/0.1, and then heating and dissolving the mixture at 100° C. under a stream of air.

Diallyl phthalate resin: DAISO DAP A (manufactured by DAISO CO., LTD.)

Hydroquinone: hydroquinone (manufactured by Seiko Chemical Co., Ltd.)

<Preparation of Varnish 2>

A varnish 2 was produced by combining a diallyl phthalate resin, ditrimethylolpropane tetraacrylate and hydroquinone in a ratio of 40/60/0.1, and then heating and dissolving the mixture at 100° C. under a stream of air.

Diallyl phthalate resin: DAISO DAP A (manufactured by DAISO CO., LTD.)

Hydroquinone: hydroquinone (manufactured by Seiko Chemical Co., Ltd.)

<Preparation of Example Inks>

Forty parts of the above varnish 1 or 2, 20 parts of Lionol Blue FG7330 (phthalocyanine, manufactured by Toyo Color Co., Ltd.) as an cyan pigment, Hi-Filler #5000PJ (talc, manufactured by Matsumura Sangyo Co., Ltd.) as an extender pigment, hydroquinone (manufactured by Seiko Chemical Co., Ltd.) as a polymerization inhibitor, together with dipentaerythritol hexaacrylate, ditrimethylolpropane tetraacrylate, ethylene oxide-modified pentaerythritol tetra (or tri) acrylate, propylene oxide-modified pentaerythritol tetraacrylate, ethylene oxide-modified trimethylolpropane triacrylate, propylene oxide-modified trimethylolpropane triacrylate and/or propylene oxide-modified glycerol triacrylate as (meth)acrylate compounds, 2-(dimethylamino)-1-(4-morpholinophenyl)-2-benzyl-1-butanone, 2-(dimethylamino)-2-(4-methylbenzyl)-1-(4-morpholinophenyl)-butan-1-one, oligo {2-hydroxy-2-methyl-1-[4-(1-methylvinyl)phenyl]propanone}, 2-hydroxy-1-[4-[4-(2-hydroxy-2-methyl-propionyl)-benzyl]-phenyl]-2-methylpropan-1-one, bis(2,4,6-trimethylbenzoyl)-phenylphosphine oxide and/or 2,4,6-trimethylbenzoyl-diphenylphosphine oxide as photopolymerization initiators, and CERAFLOUR 991 (a polyethylene wax, manufactured by BYK Chemie GmbH) as an additive were kneaded and mixed using a butterfly mixer in accordance with the formulations (parts) shown in Tables 2a and 2b, and each of the mixtures was then dispersed using a three-roll mill until the maximum particle size was not more than 7.5 m, thus preparing actinic ray-curable offset ink compositions of Examples 1 to 21.

In a similar manner, using Mitsubishi Carbon MA-11 (carbon black, manufactured by Mitsubishi Chemical Corporation) as a black pigment, actinic ray-curable offset ink compositions of Examples 22 to 41 were prepared in accordance with the formulations (parts) shown in Tables 3a and 3b.

TABLE 2a

| Formulations of example actinic ray-curable offset ink compositions (cyan) | | | | | | | | | | | | |
|---|---|---|---|---|---|---|---|---|---|---|---|---|
| | | | | Weight-average molecular weight | Remarks | Example | | | | | | |
| Classification | | | Chemical name | | | 1 | 2 | 3 | 4 | 5 | 6 | 7 |
| Photo-polymerization initiator (B) | Acyl-phosphine oxide compound | b1 | bis(2,4,6-trimethyl-benzoyl)-phenyl-phosphine oxide | 419 | b1-1 | 3 | | 5 | | 3 | 3 | 3 |
| | | | 2,4,6-trimethyl-benzoyl-diphenyl-phosphine oxide | 348 | b1 | | 3 | | 5 | | | |
| | α-amino-alkylphenone compound | b2 | 2-(dimethylamino)-1-(4-morpholino-phenyl)-2-benzyl-1-butanone | 367 | b2 | 3 | 3 | 3 | 3 | 5 | 6 | 3 |
| | | | 2-(dimethylamino)-2-(4-methylbenzyl)-1-(4-morpholino-phenyl)-butan-1-one | 381 | b2 | | | | | | | |
| | | | 2-methyl-1-[4-(methylthio)phenyl]-2-morpholino-propan-1-one | 279 | <MW300 | | | | | | | |

TABLE 2a-continued

Formulations of example actinic ray-curable offset ink compositions (cyan)

| | | | | | | | | | | | | |
|---|---|---|---|---|---|---|---|---|---|---|---|---|
| | α-hydroxy-alkylphenone compound | b3 | oligo{2-hydroxy-2-methyl-1-[4-(1-methylvinyl)phenyl]propanone} | 409 | b3 | 3 | 3 | 3 | 3 | 3 | 3 | 5 |
| | | | 2-hydroxy-1-[4-[4-(2-hydroxy-2-methyl-propionyl)-benzyl]-phenyl]-2-methylpropan-1-one | 340 | b3 | | | | | | | |
| | | | 1-hydroxycyclohexyl phenyl ketone | 204 | <MW300 | | | | | | | |
| | thioxanthone compound | Sensitizer | 2,4-diethylthioxanthone | 268 | | | | | | | | |
| | amino compound | | ethyl 4-(dimethylamino)benzoate | 254 | | | | | | | | |
| Acrylate compound (A) | hexa-functional | a2 | dipentaerythritol hexaacrylate | 547 | | 17 | 17 | 17 | 17 | 17 | 17 | 17 |
| | tetra-functional | a1 | ditrimethylolpropane tetraacrylate | 482 | | 10 | 10 | 10 | 10 | 10 | 10 | 10 |
| | tetra-functional | a1 | ethylene oxide-modified pentaerythritol tetraacrylate | 528 | | | | | | | | |
| | tetra-functional | a1 | propylene oxide-modified pentaerythritol tetraacrylate | 584 | | | | | | | | |
| | tri-functional | a1 | ethylene oxide-modified trimethylolpropane triacrylate | 428 | | | | | | | | |
| | tri-functional | a1 | propylene oxide-modified trimethylolpropane triacrylate | 470 | | | | | | | | |
| | tri-functional | a1 | propylene oxide-modified glycerol triacrylate | 428 | | | | | | | | |
| | tri-functional | | trimethylolpropane triacrylate | 296 | <MW400 | | | | | | | |
| | di-functional | | ethylene oxide adduct bisphenol A diacrylate | 424 | <3 acrylate functional groups | | | | | | | |
| | hexa-functional | a2 | dipentaerythritol hexaacrylate | 547 | varnish component | 24 | 24 | 24 | 24 | 24 | 24 | 24 |
| Pigment (C) | | | phthalocyanine blue (Lionol Blue FG7330) | — | | 20 | 20 | 20 | 20 | 20 | 20 | 20 |
| Resin | | | diallyl phthalate resin (DAISO DAP A) | — | varnish component | 16 | 16 | 16 | 16 | 16 | 16 | 16 |
| Extender Pigment | | | talc (Hi-Filler #5000PJ) | — | | 0.9 | 0.9 | 0.9 | 0.9 | 0.9 | 0.9 | 0.9 |
| Polymerization Inhibitor | | | hydroquinone (hydroquinone) | — | Includes varnish component | 0.1 | 0.1 | 0.1 | 0.1 | 0.1 | 0.1 | 0.1 |
| Other additive | | | polyethylene wax (CERAFLOUR 991) | — | | 3 | 3 | 1 | 1 | 1 | 0 | 1 |
| | Total | | | | | 100 | 100 | 100 | 100 | 100 | 100 | 100 |
| | Low migration characteristics | | | | metal halide lamp irradiation | ○ | ○ | ○ | ○ | ○ | ○ | ○ |
| | | | | | high-pressure mercury lamp irradiation | ○ | ○ | ○ | ○ | ○ | ○ | ○ |
| | Curing rate | | | | metal halide lamp irradiation | ○ | Δ | ○ | ○ | ○ | ○ | ○ |
| | | | | | high-pressure mercury lamp irradiation | Δ | Δ | ○ | Δ | ○ | ○ | ○ |
| | Adhesion | | | | metal halide lamp irradiation | ○ | ○ | ○ | ○ | ○ | ○ | ○ |
| | | | | | high-pressure mercury lamp irradiation | ○ | ○ | ○ | ○ | ○ | Δ | ○ |

TABLE 2a-continued

Formulations of example actinic ray-curable offset ink compositions (cyan)

| | Classification | | Chemical name | Weight-average molecular weight | Remarks | Example 8 | 9 | 10 | 11 | 12 | 13 | 14 |
|---|---|---|---|---|---|---|---|---|---|---|---|---|
| Photo-polymerization initiator (B) | Acyl-phosphine oxide compound | b1 | bis(2,4,6-trimethyl-benzoyl)-phenyl-phosphine oxide | 419 | b1-1 | 3 | 3 | 3 | 3 | 3 | 3 | 3 |
| | | | 2,4,6-trimethyl-benzoyl-diphenyl-phosphine oxide | 348 | b1 | | | | | | | |
| | α-amino-alkylphenone compound | b2 | 2-(dimethylamino)-1-(4-morpholino-phenyl)-2-benzyl-1-butanone | 367 | b2 | 3 | 3 | 3 | 3 | 3 | 3 | 3 |
| | | | 2-(dimethylamino)-2-(4-methylbenzyl)-1-(4-morpholino-phenyl)-butan-1-one | 381 | b2 | | | | | | | |
| | | | 2-methyl-1-[4-(methylthio)phenyl]-2-morpholino-propan-1-one | 279 | <MW300 | | | | | | | |
| | α-hydroxy-alkylphenone compound | b3 | oligo{2-hydroxy-2-methyl-1-[4-(1-methylvinyl)phenyl]propanone} | 409 | b3 | 3 | 3 | 3 | 5 | 6 | 3 | 3 |
| | | | 2-hydroxy-1-[4-[4-(2-hydroxy-2-methyl-propionyl)-benzyl]-phenyl]-2-methylpropan-1-one | 340 | b3 | | | | | | | |
| | | | 1-hydroxycyclohexyl phenyl ketone | 204 | <MW300 | | | | | | | |
| | thioxanthone compound | Sensitizer | 2,4-diethylthio-xanthone | 268 | | | | | | | | |
| | amino compound | | ethyl 4-(dimethyl-amino)benzoate | 254 | | | | | | | | |
| Acrylate compound (A) | hexa-functional | a2 | dipentaerythritol hexaacrylate | 547 | | 17 | 17 | 17 | 17 | 17 | 17 | 17 |
| | tetra-functional | a1 | ditrimethylolpropane tetraacrylate | 482 | | | | | | | | |
| | tetra-functional | a1 | ethylene oxide-modified penta-erythritol tetraacrylate | 528 | | 10 | | | | | | |
| | tetra-functional | a1 | propylene oxide-modified penta-erythritol tetraacrylate | 584 | | | 10 | | | | | |
| | tri-functional | a1 | ethylene oxide-modified trimethylol-propane triacrylate | 428 | | | | 10 | 10 | 10 | | |
| | tri-functional | a1 | propylene oxide-modified trimethylol-propane triacrylate | 470 | | | | | | | 10 | |
| | tri-functional | a1 | propylene oxide-modified glycerol triacrylate | 428 | | | | | | | | 10 |
| | tri-functional | | trimethylolpropane triacrylate | 296 | <MW400 | | | | | | | |
| | di-functional | | ethylene oxide adduct bisphenol A diacrylate | 424 | <3 acrylate functional groups | | | | | | | |
| | hexa-functional | a2 | dipentaerythritol hexaacrylate | 547 | varnish component | 24 | 24 | 24 | 24 | 24 | 24 | 24 |
| Pigment (C) | | | phthalocyanine blue (Lionol Blue FG7330) | — | | 20 | 20 | 20 | 20 | 20 | 20 | 20 |
| Resin | | | diallyl phthalate resin (DAISO DAP A) | — | varnish component | 16 | 16 | 16 | 16 | 16 | 16 | 16 |

TABLE 2a-continued

Formulations of example actinic ray-curable offset ink compositions (cyan)

| | | | | | | | | | | |
|---|---|---|---|---|---|---|---|---|---|---|
| Extender Pigment | talc (Hi-Filler #5000PJ) | — | | 0.9 | 0.9 | 0.9 | 0.9 | 0.9 | 0.9 | 0.9 |
| Polymerization Inhibitor | hydroquinone (hydroquinone) | — | Includes varnish component | 0.1 | 0.1 | 0.1 | 0.1 | 0.1 | 0.1 | 0.1 |
| Other additive | polyethylene wax (CERAFLOUR 991) | — | | 3 | 3 | 3 | 1 | 0 | 3 | 3 |
| | Total | | | 100 | 100 | 100 | 100 | 100 | 100 | 100 |
| | Low migration characteristics | | metal halide lamp irradiation | ○ | ○ | ○ | ○ | ○ | ○ | ○ |
| | | | high-pressure mercury lamp irradiation | ○ | ○ | ○ | ○ | ○ | ○ | ○ |
| | Curing rate | | metal halide lamp irradiation | ○ | ○ | Δ | ○ | ○ | Δ | Δ |
| | | | high-pressure mercury lamp irradiation | Δ | Δ | Δ | ○ | ○ | Δ | Δ |
| | Adhesion | | metal halide lamp irradiation | ○ | ○ | ○ | ○ | Δ | ○ | ○ |
| | | | high-pressure mercury lamp irradiation | ○ | ○ | ○ | ○ | Δ | ○ | ○ |

TABLE 2b

Formulations of example actinic ray-curable offset ink compositions (cyan)

| | | | | Weight-average molecular weight | Remarks | Example | | | | | | |
|---|---|---|---|---|---|---|---|---|---|---|---|---|
| | Classification | | Chemical name | | | 15 | 16 | 17 | 18 | 19 | 20 | 21 |
| Photopolymerization initiator (B) | Acylphosphine oxide compound | b1 | bis(2,4,6-trimethyl-benzoyl)-phenyl-phosphine oxide | 419 | b1-1 | 3 | 1 | 3 | 3 | 1 | 3 | 3 |
| | | | 2,4,6-trimethyl-benzoyl-diphenyl-phosphine oxide | 348 | b1 | | | | | | | |
| | α-amino-alkylphenone compound | b2 | 2-(dimethylamino)-1-(4-morpholino-phenyl)-2-benzyl-1-butanone | 367 | b2 | 3 | 3 | 1 | 3 | 1 | | 3 |
| | | | 2-(dimethylamino)-2-(4-methylbenzyl)-1-(4-morpholino-phenyl)-butan-1-one | 381 | b2 | | | | | | 3 | |
| | | | 2-methyl-1-[4-(methylthio)phenyl]-2-morpholino-propan-1-one | 279 | <MW300 | | | | | | | |
| | α-hydroxy-alkylphenone compound | b3 | oligo{2-hydroxy-2-methyl-1-[4-(1-methylvinyl)phenyl]propanone} | 409 | b3 | 3 | 3 | 3 | 1 | 1 | 3 | |
| | | | 2-hydroxy-1-[4-[4-2-hydroxy-2-methyl-propionyl)-benzyl]-phenyl]-2-methylpropan-1-one | 340 | b3 | | | | | | | 3 |
| | | | 1-hydroxycyclohexyl phenyl ketone | 204 | <MW300 | | | | | | | |
| | thioxanthone compound | Sensitizer | 2,4-diethylthio-xanthone | 268 | | | | | | | | |
| | amino compound | | ethyl 4-(dimethyl-amino)benzoate | 254 | | | | | | | | |
| Acrylate compound (A) | hexa-functional | a2 | dipentaerythritol hexaacrylate | 547 | | 27 | 19 | 19 | 19 | 34 | 17 | 17 |
| | tetra-functional | a1 | ditrimethylolpropane tetraacrylate | 482 | | 2 | 10 | 10 | 10 | | 10 | 10 |
| | tetra-functional | a1 | ethylene oxide-modified penta-erythritol tetraacrylate | 528 | | | | | | 2 | | |

TABLE 2b-continued

Formulations of example actinic ray-curable offset ink compositions (cyan)

| | Classification | | Chemical name | Weight-average molecular weight | Remarks | Example 15 | 16 | 17 | 18 | 19 | 20 | 21 |
|---|---|---|---|---|---|---|---|---|---|---|---|---|
| | tetra-functional | a1 | propylene oxide-modified pentaerythritol tetraacrylate | 584 | | | | | | | | |
| | tri-functional | a1 | ethylene oxide-modified trimethylolpropane triacrylate | 428 | | | | | | | | |
| | tri-functional | a1 | propylene oxide-modified trimethylolpropane triacrylate | 470 | | | | | | | | |
| | tri-functional | a1 | propylene oxide-modified glycerol triacrylate | 428 | | | | | | | | |
| | tri-functional | | trimethylolpropane triacrylate | 296 | <MW400 | | | | | | | |
| | di-functional | | ethylene oxide adduct bisphenol A diacrylate | 424 | <3 acrylate functional groups | | | | | | | |
| | hexa-functional | a2 | dipentaerythritol hexaacrylate | 547 | varnish component | 24 | 24 | 24 | 24 | 24 | 24 | 24 |
| Pigment (C) | | | phthalocyanine blue (Lionol Blue FG7330) | — | | 20 | 20 | 20 | 20 | 20 | 20 | 20 |
| Resin | | | diallyl phthalate resin (DAISO DAP A) | — | varnish component | 16 | 16 | 16 | 16 | 16 | 16 | 16 |
| Extender Pigment | | | talc (Hi-Filler #5000PJ) | — | | 0.9 | 0.9 | 0.9 | 0.9 | 0.9 | 0.9 | 0.9 |
| Polymerization Inhibitor | | | hydroquinone (hydroquinone) | — | Includes varnish component | 0.1 | 0.1 | 0.1 | 0.1 | 0.1 | 0.1 | 0.1 |
| Other additive | | | polyethylene wax (CERAFLOUR 991) | — | | 1 | 3 | 3 | 3 | 0 | 3 | 3 |
| | Total | | | | | 100 | 100 | 100 | 100 | 100 | 100 | 100 |
| | Low migration characteristics | | | | metal halide lamp irradiation | ○ | ○ | ○ | ○ | ○ | ○ | ○ |
| | | | | | high-pressure mercury lamp irradiation | ○ | ○ | ○ | ○ | ○ | ○ | ○ |
| | Curing rate | | | | metal halide lamp irradiation | ○ | Δ | Δ | Δ | Δ | ○ | ○ |
| | | | | | high-pressure mercury lamp irradiation | ○ | Δ | Δ | Δ | Δ | Δ | Δ |
| | Adhesion | | | | metal halide lamp irradiation | Δ | ○ | ○ | ○ | Δ | ○ | ○ |
| | | | | | high-pressure mercury lamp irradiation | Δ | ○ | ○ | ○ | Δ | ○ | ○ |

TABLE 3a

Formulations of example actinic ray-curable offset ink compositions (black)

| | Classification | | Chemical name | Weight-average molecular weight | Remarks | Example 22 | 23 | 24 | 25 | 26 | 27 | 28 |
|---|---|---|---|---|---|---|---|---|---|---|---|---|
| Photopolymerization initiator (B) | Acylphosphine oxide compound | b1 | bis(2,4,6-trimethylbenzoyl)-phenyl-phosphine oxide | 419 | b1-1 | 3 | | 5 | | 3 | 3 | 3 |
| | | | 2,4,6-trimethyl-benzoyl-diphenyl-phosphine oxide | 348 | b1 | | 3 | | 5 | | | |
| | α-aminoalkylphenone compound | b2 | 2-(dimethylamino)-1-(4-morpholino-phenyl)-2-benzyl-1-butanone | 367 | b2 | 3 | 3 | 3 | 3 | 5 | 6 | 3 |
| | | | 2-methyl-1-[4-(methylthio)phenyl]-2-morpholino-propan-1-one | 279 | <MW300 | | | | | | | |

TABLE 3a-continued

Formulations of example actinic ray-curable offset ink compositions (black)

| | | | | | | | | | | | | | |
|---|---|---|---|---|---|---|---|---|---|---|---|---|---|
| | α-hydroxy-alkylphenone compound | b3 | oligo{2-hydroxy-2-methyl-1-[4-(1-methylvinyl)phenyl]propanone} | 409 | b3 | 3 | 3 | 3 | 3 | 3 | 3 | 5 |
| | | | 1-hydroxycyclohexyl phenyl ketone | 204 | <MW300 | | | | | | | |
| | thioxanthone compound | sensitizer | 2,4-diethylthioxanthone | 268 | | | | | | | | |
| | amino compound | | ethyl 4-(dimethylamino)benzoate | 254 | | | | | | | | |
| | | | 4,4'-diethylaminobenzophenone | 325 | | | | | | | | |
| Acrylate compound (A) | hexa-functional | a2 | dipentaerythritol hexaacrylate | 547 | | 17 | 17 | 17 | 17 | 17 | 17 | 17 |
| | tetra-functional | a1 | ditrimethylolpropane tetraacrylate | 482 | | 10 | 10 | 10 | 10 | 10 | 10 | 10 |
| | tetra-functional | a1 | ethylene oxide-modified pentaerythritol tetraacrylate | 528 | | | | | | | | |
| | tetra-functional | a1 | propylene oxide-modified pentaerythritol tetraacrylate | 584 | | | | | | | | |
| | tri-functional | a1 | ethylene oxide-modified trimethylolpropane triacrylate | 428 | | | | | | | | |
| | tri-functional | a1 | propylene oxide-modified trimethylolpropane triacrylate | 470 | | | | | | | | |
| | tri-functional | a1 | propylene oxide-modified glycerol triacrylate | 428 | | | | | | | | |
| | tri-functional | | trimethylolpropane triacrylate | 296 | <MW400 | | | | | | | |
| | di-functional | | ethylene oxide adduct bisphenol A diacrylate | 424 | <3 acrylate functional groups | | | | | | | |
| | hexa-functional | a2 | dipentaerythritol hexaacrylate | 547 | varnish component | 24 | 24 | 24 | 24 | 24 | 24 | 24 |
| | tetra-functional | a1 | ditrimethylolpropane tetraacrylate | 482 | varnish component | | | | | | | |
| Pigment (C) | | | carbon black (Mitsubishi Carbon MA-11) | — | | 20 | 20 | 20 | 20 | 20 | 20 | 20 |
| Resin | | | diallyl phthalate resin (DAISO DAP A) | — | varnish component | 16 | 16 | 16 | 16 | 16 | 16 | 16 |
| Extender Pigment | | | talc (Hi-Filler #5000PJ) | — | | 0.9 | 0.9 | 0.9 | 0.9 | 0.9 | 0.9 | 0.9 |
| Polymerization Inhibitor | | | hydroquinone (hydroquinone) | — | Includes varnish component | 0.1 | 0.1 | 0.1 | 0.1 | 0.1 | 0.1 | 0.1 |
| Other additive | | | polyethylene wax (CERAFLOUR 991) | — | | 3 | 3 | 1 | 1 | 1 | 0 | 1 |
| | | | Total | | | 100 | 100 | 100 | 100 | 100 | 100 | 100 |
| | | | Low migration characteristics | | metal halide lamp irradiation | ○ | ○ | ○ | ○ | ○ | ○ | ○ |
| | | | | | high-pressure mercury lamp irradiation | ○ | ○ | ○ | ○ | ○ | ○ | ○ |
| | | | Curing rate | | metal halide lamp irradiation | ○ | Δ | ○ | ○ | ○ | ○ | ○ |
| | | | | | high-pressure mercury lamp irradiation | Δ | Δ | ○ | Δ | ○ | ○ | ○ |
| | | | Adhesion | | metal halide lamp irradiation | ○ | ○ | ○ | ○ | ○ | ○ | ○ |
| | | | | | high-pressure mercury lamp irradiation | ○ | ○ | ○ | ○ | ○ | Δ | ○ |

| | | | | Weight-average molecular | | Example | | | | | |
|---|---|---|---|---|---|---|---|---|---|---|---|
| | Classification | | Chemical name | weight | Remarks | 29 | 30 | 31 | 32 | 33 | 34 |
| Photopolymerization initiator (B) | Acylphosphine oxide compound | b1 | bis(2,4,6-trimethylbenzoyl)-phenyl-phosphine oxide | 419 | b1-1 | 3 | 3 | 3 | 3 | 3 | 3 |
| | | | 2,4,6-trimethylbenzoyl-diphenyl-phosphine oxide | 348 | b1 | | | | | | |

TABLE 3a-continued

Formulations of example actinic ray-curable offset ink compositions (black)

| | | | | | | | | | | | |
|---|---|---|---|---|---|---|---|---|---|---|---|
| | α-amino-alkylphenone compound | b2 | 2-(dimethylamino)-1-(4-morpholino-phenyl)-2-benzyl-1-butanone | 367 | b2 | 3 | 3 | 3 | 3 | 3 | 3 |
| | | | 2-methyl-1-[4-(methylthio)phe-nyl]-2-morpholino-propan-1-one | 279 | <MW300 | | | | | | |
| | α-hydroxy-alkylphenone compound | b3 | oligo{2-hydroxy-2-methyl-1-[4-(1-methylvinyl)phe-nyl]propanone} | 409 | b3 | 3 | 3 | 3 | 5 | 6 | 3 |
| | | | 1-hydroxycyclohexyl phenyl ketone | 204 | <MW300 | | | | | | |
| | thioxanthone compound | sensi-tizer | 2,4-diethylthio-xanthone | 268 | | | | | | | |
| | amino compound | | ethyl 4-(dimethyl-amino)benzoate | 254 | | | | | | | |
| | | | 4,4'-diethylamino-benzophenone | 325 | | | | | | | |
| Acrylate compound (A) | hexa-functional | a2 | dipentaerythritol hexaacrylate | 547 | | 17 | 17 | 17 | 17 | 17 | 17 |
| | tetra-functional | a1 | ditrimethylolpropane tetraacrylate | 482 | | | | | | | |
| | tetra-functional | a1 | ethylene oxide-modified penta-erythritol tetraacrylate | 528 | | 10 | | | | | |
| | tetra-functional | a1 | propylene oxide-modified penta-erythritol tetraacrylate | 584 | | | 10 | | | | |
| | tri-functional | a1 | ethylene oxide-modified trimethylol-propane triacrylate | 428 | | | | 10 | 10 | 10 | |
| | tri-functional | a1 | propylene oxide-modified trimethylol-propane triacrylate | 470 | | | | | | | 10 |
| | tri-functional | a1 | propylene oxide-modified glycerol triacrylate | 428 | | | | | | | |
| | tri-functional | | trimethylolpropane triacrylate | 296 | <MW400 | | | | | | |
| | di-functional | | ethylene oxide adduct bisphenol A diacrylate | 424 | <3 acrylate functional groups | | | | | | |
| | hexa-functional | a2 | dipentaerythritol hexaacrylate | 547 | varnish component | 24 | 24 | 24 | 24 | 24 | 24 |
| | tetra-functional | a1 | ditrimethylolpropane tetraacrylate | 482 | varnish component | | | | | | |
| Pigment (C) | carbon black (Mitsubishi Carbon MA-11) | | | — | | 20 | 20 | 20 | 20 | 20 | 20 |
| Resin | diallyl phthalate resin (DAISO DAP A) | | | — | varnish component | 16 | 16 | 16 | 16 | 16 | 16 |
| Extender Pigment | talc (Hi-Filler #5000PJ) | | | — | | 0.9 | 0.9 | 0.9 | 0.9 | 0.9 | 0.9 |
| Polymer-ization Inhibitor | hydroquinone (hydroquinone) | | | — | Includes varnish component | 0.1 | 0.1 | 0.1 | 0.1 | 0.1 | 0.1 |
| Other additive | polyethylene wax (CERAFLOUR 991) | | | — | | 3 | 3 | 3 | 1 | 0 | 3 |
| | Total | | | | | 100 | 100 | 100 | 100 | 100 | 100 |
| | Low migration characteristics | | | metal halide lamp irradiation | | ○ | ○ | ○ | ○ | ○ | ○ |
| | | | | high-pressure mercury lamp irradiation | | ○ | ○ | ○ | ○ | ○ | ○ |
| | Curing rate | | | metal halide lamp irradiation | | ○ | ○ | Δ | ○ | ○ | Δ |
| | | | | high-pressure mercury lamp irradiation | | Δ | Δ | Δ | ○ | ○ | Δ |
| | Adhesion | | | metal halide lamp irradiation | | ○ | ○ | ○ | ○ | Δ | ○ |
| | | | | high-pressure mercury lamp irradiation | | ○ | ○ | ○ | ○ | Δ | ○ |

TABLE 3b

Formulations of example actinic ray-curable offset ink compositions (black)

| Classification | | | Chemical name | Weight-average molecular weight | Remarks | Example 35 | 36 | 37 | 38 | 39 | 40 | 41 |
|---|---|---|---|---|---|---|---|---|---|---|---|---|
| Photo-polymerization initiator (B) | Acyl-phosphine oxide compound | b1 | bis(2,4,6-trimethyl-benzoyl)-phenyl-phosphine oxide | 419 | b1-1 | 3 | 3 | 1 | 3 | 3 | 1 | 5 |
| | | | 2,4,6-trimethyl-benzoyl-diphenyl-phosphine oxide | 348 | b1 | | | | | | | |
| | α-amino-alkylphenone compound | b2 | 2-(dimethylamino)-1-(4-morpholino-phenyl)-2-benzyl-1-butanone | 367 | b2 | 3 | 3 | 3 | 1 | 3 | 1 | 3 |
| | | | 2-methyl-1-[4-(methylthio)phe-nyl]-2-morpholino-propan-1-one | 279 | <MW300 | | | | | | | |
| | α-hydroxy-alkylphenone compound | b3 | oligo{2-hydroxy-2-methyl-1-[4-(1-methylvinyl)phe-nyl]propanone} | 409 | b3 | 3 | 3 | 3 | 3 | 1 | 1 | 3 |
| | | | 1-hydroxycyclohexyl phenyl ketone | 204 | <MW300 | | | | | | | |
| | thioxanthone compound | sensi-tizer | 2,4-diethylthio-xanthone | 268 | | | | | | | | |
| | amino compound | | ethyl 4-(dimethyl-amino)benzoate | 254 | | | | | | | | |
| | | | 4,4'-diethylamino-benzophenone | 325 | | | | | | | | |
| Acrylate compound (A) | hexa-functional | a2 | dipentaerythritol hexaacrylate | 547 | | 17 | 27 | 19 | 19 | 19 | 34 | 1 |
| | tetra-functional | a1 | ditrimethylolpropane tetraacrylate | 482 | | | 2 | 10 | 10 | 10 | | 24 |
| | tetra-functional | a1 | ethylene oxide-modified penta-erythritol tetraacrylate | 528 | | | | | | | 2 | |
| | tetra-functional | a1 | propylene oxide-modified penta-erythritol tetraacrylate | 584 | | | | | | | | |
| | tri-functional | a1 | ethylene oxide-modified trimethylol-propane triacrylate | 428 | | | | | | | | |
| | tri-functional | a1 | propylene oxide-modified trimethylol-propane triacrylate | 470 | | | | | | | | |
| | tri-functional | a1 | propylene oxide-modified glycerol triacrylate | 428 | | 10 | | | | | | |
| | tri-functional | | trimethylolpropane triacrylate | 296 | <MW400 | | | | | | | |
| | di-functional | | ethylene oxide adduct bisphenol A diacrylate | 424 | <3 acrylate functional groups | | | | | | | |
| | hexa-functional | a2 | dipentaerythritol hexaacrylate | 547 | varnish component | 24 | 24 | 24 | 24 | 24 | 24 | |
| | tetra-functional | a1 | ditrimethylolpropane tetraacrylate | 482 | varnish component | | | | | | | 24 |
| Pigment (C) | | | carbon black (Mitsubishi Carbon MA-11) | — | | 20 | 20 | 20 | 20 | 20 | 20 | 20 |
| Resin | | | diallyl phthalate resin (DAISO DAP A) | — | varnish component | 16 | 16 | 16 | 16 | 16 | 16 | 16 |
| Extender Pigment | | | talc (Hi-Filler #5000PJ) | — | | 0.9 | 0.9 | 0.9 | 0.9 | 0.9 | 0.9 | 0.9 |
| Polymerization Inhibitor | | | hydroquinone (hydroquinone) | — | Includes varnish component | 0.1 | 0.1 | 0.1 | 0.1 | 0.1 | 0.1 | 0.1 |
| Other additive | | | polyethylene wax (CERAFLOUR 991) | — | | 3 | 1 | 3 | 3 | 3 | 0 | 3 |
| | | | Total | | | 100 | 100 | 100 | 100 | 100 | 100 | 100 |
| | | | Low migration characteristics | | metal halide lamp irradiation | ○ | ○ | ○ | ○ | ○ | ○ | ○ |
| | | | | | high-pressure mercury lamp irradiation | ○ | ○ | ○ | ○ | ○ | ○ | ○ |

TABLE 3b-continued

Formulations of example actinic ray-curable offset ink compositions (black)

| Classification | Chemical name | Weight-average molecular weight | Remarks | Example | | | | | | |
|---|---|---|---|---|---|---|---|---|---|---|
| | | | | 35 | 36 | 37 | 38 | 39 | 40 | 41 |
| Curing rate | | metal halide lamp irradiation | | Δ | ○ | Δ | Δ | Δ | Δ | Δ |
| | | high-pressure mercury lamp irradiation | | Δ | ○ | Δ | Δ | Δ | Δ | Δ |
| Adhesion | | metal halide lamp irradiation | | ○ | Δ | ○ | ○ | ○ | Δ | Δ |
| | | high-pressure mercury lamp irradiation | | ○ | Δ | ○ | ○ | ○ | Δ | Δ |

<Preparation of Comparative Inks>

Forty parts of the above varnish 1 or 2, 20 parts of Lionol Blue FG7330 (phthalocyanine, manufactured by Toyo Color Co., Ltd.) as an cyan pigment, Hi-Filler #5000PJ (talc, manufactured by Matsumura Sangyo Co., Ltd.) as an extender pigment, hydroquinone (manufactured by Seiko Chemical Co., Ltd.) as a polymerization inhibitor, together with dipentaerythritol hexaacrylate, ditrimethylolpropane tetraacrylate, trimethylolpropane triacrylate and/or ethylene oxide adduct bisphenol A diacrylate as (meth)acrylate compounds, 2-(dimethylamino)-1-(4-morpholinophenyl)-2-benzyl-1-butanone, 2-methyl-1-[4-(methylthio)phenyl]-2-morpholinopropan-1-one, oligo {2-hydroxy-2-methyl-1-[4-(1-methylvinyl)phenyl]propanone}, 1-hydroxycyclohexyl phenyl ketone, bis(2,4,6-trimethylbenzoyl)-phenylphosphine oxide and/or 2,4,6-trimethylbenzoyl-diphenylphosphine oxide as photopolymerization initiators, 2,4-diethylthioxanthone, ethyl 4-(dimethylamino)benzoate and/or 4,4'-diethylaminobenzophenone as sensitizers, and CERAFLOUR 991 (a polyethylene wax, manufactured by BYK Chemie GmbH) as an additive were kneaded and mixed using a butterfly mixer in accordance with the formulations (parts) shown in Tables 4a and 4b, and each of the mixtures was then dispersed using a three-roll mill until the maximum particle size was not more than 7.5 μm, thus preparing actinic ray-curable offset ink compositions of Comparative Examples 1 to 31.

In a similar manner, using Mitsubishi Carbon MA-11 (carbon black, manufactured by Mitsubishi Chemical Corporation) as a black pigment, actinic ray-curable offset ink compositions of Comparative Examples 32 to 64 were prepared in accordance with the formulations (parts) shown in Tables 5a and 5b.

TABLE 4a

Formulations of comparative actinic ray-curable offset ink compositions (cyan)

| Classification | | | Chemical name | Weight-average molecular weight | Remarks | Comparative Example | | | | | | | | |
|---|---|---|---|---|---|---|---|---|---|---|---|---|---|---|
| | | | | | | 1 | 2 | 3 | 4 | 5 | 6 | 7 | 8 | 9 |
| Photo-polymerization initiator (B) | Acylphosphine oxide compound | b1 | bis(2,4,6-trimethyl-benzoyl)-phenyl-phosphine oxide | 419 | b1-1 | 3 | 3 | 3 | | | | 3 | 3 | 3 |
| | | | 2,4,6-trimethyl-benzoyl-diphenyl-phosphine oxide | 348 | b1 | | | | 3 | 3 | 3 | | | |
| | α-amino-alkylphenone compound | b2 | 2-(dimethylamino)-1-(4-morpholino-phenyl)-2-benzyl-1-butanone | 367 | b2 | 3 | 3 | 3 | 3 | 3 | 3 | | 3 | 3 |
| | | | 2-(dimethylamino)-2-(4-methylbenzyl)-1-(4-morpholino-phenyl)-butan-1-one | 381 | b2 | | | | | | | | | |
| | | | 2-methyl-1-[4-(methylthio)phenyl]-2-morpholino-propan-1-one | 279 | <MW300 | | | | | | | | 3 | 0.5 |
| | α-hydroxy-alkylphenone compound | b3 | oligo{2-hydroxy-2-methyl-1-[4-(1-methylvinyl)phenyl]propanone} | 409 | b3 | 3 | 3 | 3 | 3 | 3 | 3 | 3 | 3 | |
| | | | 2-hydroxy-1-[4-[4-(2-hydroxy-2-methyl-propionyl)-benzyl]-phenyl]-2-methylpropan-1-one | 340 | b3 | | | | | | | | | |
| | | | 1-hydroxycyclohexyl phenyl ketone | 204 | <MW300 | | | | | | | | | 3 |

TABLE 4a-continued

Formulations of comparative actinic ray-curable offset ink compositions (cyan)

|  |  |  |  |  |  |  |  |  |  |  |  |  |  |
|---|---|---|---|---|---|---|---|---|---|---|---|---|---|
|  | thioxanthone compound | Sensitizer | 2,4-diethylthio-xanthone | 268 |  | 1 | 0.5 | 1 |  | 0.5 |  |  |  |
|  | amino compound |  | ethyl 4-(dimethyl-amino)benzoate | 254 |  |  | 1 | 0.5 |  | 1 | 0.5 |  |  |
| Acrylate compound (A) | hexa-functional | a2 | dipentaerythritol hexaacrylate | 547 |  | 17 | 17 | 17 | 17 | 17 | 17 | 17 | 17 | 17 |
|  | tetra-functional | a1 | ditrimethylolpropane tetraacrylate | 482 |  | 10 | 10 | 10 | 10 | 10 | 10 | 10 | 10 | 10 |
|  | tetra-functional | a1 | ethylene oxide-modified penta-erythritol tetraacrylate | 528 |  |  |  |  |  |  |  |  |  |  |
|  | tetra-functional | a1 | propylene oxide-modified penta-erythritol tetraacrylate | 584 |  |  |  |  |  |  |  |  |  |  |
|  | tri-functional | a1 | ethylene oxide-modified trimethylol-propane triacrylate | 428 |  |  |  |  |  |  |  |  |  |  |
|  | tri-functional | a1 | propylene oxide-modified trimethylol-propane triacrylate | 470 |  |  |  |  |  |  |  |  |  |  |
|  | tri-functional | a1 | propylene oxide-modified glycerol triacrylate | 428 |  |  |  |  |  |  |  |  |  |  |
|  | tri-functional |  | trimethylolpropane triacrylate | 296 | <MW400 |  |  |  |  |  |  |  |  |  |
|  | di-functional |  | ethylene oxide adduct bisphenol A diacrylate | 424 | <3 acrylate functional groups |  |  |  |  |  |  |  |  |  |
|  | hexa-functional |  | dipentaerythritol hexaacrylate | 547 | varnish component | 24 | 24 | 24 | 24 | 24 | 24 | 24 | 24 | 24 |
| Pigment (C) |  |  | phthalocyanine blue (Lionol Blue FG7330) | — |  | 20 | 20 | 20 | 20 | 20 | 20 | 20 | 20 | 20 |
| Resin |  |  | diallyl phthalate resin (DAISO DAP A) | — | varnish component | 16 | 16 | 16 | 16 | 16 | 16 | 16 | 16 | 16 |
| Extender Pigment |  |  | talc (Hi-Filler #5000PJ) | — |  | 0.9 | 0.9 | 0.9 | 0.9 | 0.9 | 0.9 | 0.9 | 0.9 | 0.9 |
| Polymerization Inhibitor |  |  | hydroquinone (hydroquinone) | — | Includes varnish component | 0.1 | 0.1 | 0.1 | 0.1 | 0.1 | 0.1 | 0.1 | 0.1 | 0.1 |
| Other additive |  |  | polyethylene wax (CERAFLOUR 991) | — |  | 2 | 2 | 2 | 3 | 2 | 2 | 3 | 2.5 | 3 |
|  |  | Total |  |  |  | 100 | 100 | 100 | 100 | 100 | 100 | 100 | 100 | 100 |
|  |  | Low migration characteristics |  |  | metal halide lamp irradiation | x | x | x | x | x | x | x | x | x |
|  |  |  |  |  | high-pressure mercury lamp irradiation | x | x | x | x | x | x | x | x | x |
|  |  | Curing rate |  |  | metal halide lamp irradiation | ○ | ○ | ○ | ○ | ○ | ○ | ○ | ○ | ○ |
|  |  |  |  |  | high-pressure mercury lamp irradiation | ○ | ○ | ○ | ○ | ○ | ○ | ○ | ○ | ○ |
|  |  | Adhesion |  |  | metal halide lamp irradiation | ○ | ○ | ○ | ○ | ○ | ○ | ○ | ○ | ○ |
|  |  |  |  |  | high-pressure mercury lamp irradiation | ○ | ○ | ○ | ○ | ○ | ○ | ○ | ○ | ○ |

| Classification | | | Chemical name | Weight-average molecular weight | Remarks | Comparative Example | | | | | | | | |
|---|---|---|---|---|---|---|---|---|---|---|---|---|---|---|
|  |  |  |  |  |  | 10 | 11 | 12 | 13 | 14 | 15 | 16 | 17 | 18 |
| Photo-polymerization initiator (B) | Acyl-phosphine oxide compound | b1 | bis(2,4,6-trimethyl-benzoyl)-phenyl-phosphine oxide | 419 | b1-1 | 3 |  |  |  |  |  |  |  |  |
|  |  |  | 2,4,6-trimethyl-benzoyl-diphenyl-phosphine oxide | 348 | b1 |  | 3 | 3 | 3 | 3 |  |  |  |  |
|  | α-amino-alkylphenone compound | b2 | 2-(dimethylamino)-1-(4-morpholino-phenyl)-2-benzyl-1-butanone | 367 | b2 | 3 |  | 3 | 3 | 3 | 3 | 5 | 3 | 5 |
|  |  |  | 2-(dimethylamino)-2-(4-methylbenzyl)-1-(4-morpholino-phenyl)-butan-1-one | 381 | b2 |  |  |  |  |  |  |  |  |  |

TABLE 4a-continued

Formulations of comparative actinic ray-curable offset ink compositions (cyan)

| | | | | | | | | | | | | | | |
|---|---|---|---|---|---|---|---|---|---|---|---|---|---|---|
| | | | 2-methyl-1-[4-(methylthio)phenyl]-2-morpholino-propan-1-one | 279 | <MW300 | | 3 | 0.5 | | | | | | |
| | α-hydroxy-alkylphenone compound | b3 | oligo{2-hydroxy-2-methyl-1-[4-(1-methylvinyl)phenyl]propanone} | 409 | b3 | 3 | 3 | 3 | | 3 | 3 | 3 | 5 | 5 |
| | | | 2-hydroxy-1-[4-[4-(2-hydroxy-2-methyl-propionyl)-benzyl]-phenyl]-2-methylpropan-1-one | 340 | b3 | | | | | | | | | |
| | | | 1-hydroxycyclohexyl phenyl ketone | 204 | <MW300 | 0.5 | | | 3 | 0.5 | | | | |
| | thioxanthone compound | Sensitizer | 2,4-diethylthioxanthone | 268 | | | | | | | | | | |
| | amino compound | | ethyl 4-(dimethylamino)benzoate | 254 | | | | | | | | | | |
| Acrylate compound (A) | hexafunctional | a2 | dipentaerythritol hexaacrylate | 547 | | 17 | 17 | 17 | 17 | 17 | 17 | 17 | 17 | 17 |
| | tetrafunctional | a1 | ditrimethylolpropane tetraacrylate | 482 | | 10 | 10 | 10 | 10 | 10 | 10 | 10 | 10 | 10 |
| | tetrafunctional | a1 | ethylene oxide-modified pentaerythritol tetraacrylate | 528 | | | | | | | | | | |
| | tetrafunctional | a1 | propylene oxide-modified pentaerythritol tetraacrylate | 584 | | | | | | | | | | |
| | trifunctional | a1 | ethylene oxide-modified trimethylolpropane triacrylate | 428 | | | | | | | | | | |
| | trifunctional | a1 | propylene oxide-modified trimethylolpropane triacrylate | 470 | | | | | | | | | | |
| | trifunctional | a1 | propylene oxide-modified glycerol triacrylate | 428 | | | | | | | | | | |
| | trifunctional | | trimethylolpropane triacrylate | 296 | <MW400 | | | | | | | | | |
| | difunctional | | ethylene oxide adduct bisphenol A diacrylate | 424 | <3 acrylate functional groups | | | | | | | | | |
| | hexafunctional | a2 | dipentaerythritol hexaacrylate | 547 | varnish component | 24 | 24 | 24 | 24 | 24 | 24 | 24 | 24 | 24 |
| Pigment (C) | | | phthalocyanine blue (Lionol Blue FG7330) | — | | 20 | 20 | 20 | 20 | 20 | 20 | 20 | 20 | 20 |
| Resin | | | diallyl phthalate resin (DAISO DAP A) | — | varnish component | 16 | 16 | 16 | 16 | 16 | 16 | 16 | 16 | 16 |
| Extender Pigment | | | talc (Hi-Filler #5000PJ) | — | | 0.9 | 0.9 | 0.9 | 0.9 | 0.9 | 3.9 | 1.9 | 1.9 | 0.9 |
| Polymerization Inhibitor | | | hydroquinone (hydroquinone) | — | Includes varnish component | 0.1 | 0.1 | 0.1 | 0.1 | 0.1 | 0.1 | 0.1 | 0.1 | 0.1 |
| Other additive | | | polyethylene wax (CERAFLOUR 991) | — | | 2.5 | 3 | 2.5 | 3 | 2.5 | 3 | 3 | 3 | 2 |
| | Total | | | | | 100 | 100 | 100 | 100 | 100 | 100 | 100 | 100 | 100 |
| | Low migration characteristics | | | | metal halide lamp irradiation | x | x | x | x | x | ○ | ○ | ○ | ○ |
| | | | | | high-pressure mercury lamp irradiation | x | x | x | x | x | ○ | ○ | ○ | ○ |
| | Curing rate | | | | metal halide lamp irradiation | ○ | ○ | ○ | ○ | ○ | x | x | x | x |
| | | | | | high-pressure mercury lamp irradiation | ○ | ○ | ○ | ○ | ○ | x | x | x | x |
| | Adhesion | | | | metal halide lamp irradiation | ○ | ○ | ○ | ○ | ○ | ○ | ○ | ○ | ○ |
| | | | | | high-pressure mercury lamp irradiation | ○ | ○ | ○ | ○ | ○ | ○ | ○ | ○ | ○ |

TABLE 4b

Formulations of comparative actinic ray-curable offset ink compositions (cyan)

| | Classification | | Chemical name | Weight-average molecular weight | Remarks | Comparative Example 19 | 20 | 21 | 22 | 23 | 24 | 25 |
|---|---|---|---|---|---|---|---|---|---|---|---|---|
| Photo-polymerization initiator (B) | Acyl-phosphine oxide compound | b1 | bis(2,4,6-trimethyl-benzoyl)-phenyl-phosphine oxide | 419 | b1-1 | 5.1 | | 3 | 3 | 3 | 3 | |
| | | | 2,4,6-trimethyl-benzoyl-diphenyl-phosphine oxide | 348 | b1 | | 5.1 | | | | | |
| | α-amino-alkylphenone compound | b2 | 2-(dimethylamino)-1-(4-morpholino-phenyl)-2-benzyl-1-butanone | 367 | b2 | 3 | 3 | 3 | 3 | 3 | 3 | 3 |
| | | | 2-(dimethylamino)-2-(4-methylbenzyl)-1-(4-morpholino-phenyl)-butan-1-one | 381 | b2 | | | | | | | |
| | | | 2-methyl-1-[4-(methylthio)phenyl]-2-morpholino-propan-1-one | 279 | <MW300 | | | | | | | |
| | α-hydroxy-alkylphenone compound | b3 | oligo{2-hydroxy-2-methyl-1-[4-(1-methylvinyl)phenyl]propanone} | 409 | b3 | 3 | 3 | 3 | 3 | 3 | 3 | 3 |
| | | | 2-hydroxy-1-[4-[4-(2-hydroxy-2-methyl-propionyl)-benzyl]-phenyl]-2-methylpropan-1-one | 340 | b3 | | | | | | | |
| | | | 1-hydroxycyclohexyl phenyl ketone | 204 | <MW300 | | | | | | | |
| | thioxanthone compound | Sensitizer | 2,4-diethylthio-xanthone | 268 | | | | | | | | 3 |
| | amino compound | | ethyl 4-(dimethyl-amino)benzoate | 254 | | | | | | | | |
| Acrylate compound (A) | hexa-functional | a2 | dipentaerythritol hexaacrylate | 547 | | 17 | 17 | 17 | 17 | 17 | 17 | 17 |
| | tetra-functional | a1 | ditrimethylolpropane tetraacrylate | 482 | | 10 | 10 | | 9.5 | | 9.5 | 10 |
| | tetra-functional | a1 | ethylene oxide-modified penta-erythritol tetraacrylate | 528 | | | | | | | | |
| | tetra-functional | a1 | propylene oxide-modified penta-erythritol tetraacrylate | 584 | | | | | | | | |
| | tri-functional | a1 | ethylene oxide-modified trimethylol-propane triacrylate | 428 | | | | | | | | |
| | tri-functional | a1 | propylene oxide-modified trimethylol-propane triacrylate | 470 | | | | | | | | |
| | tri-functional | a1 | propylene oxide-modified glycerol triacrylate | 428 | | | | | | | | |
| | tri-functional | | trimethylolpropane triacrylate | 296 | <MW400 | | | 10 | 0.5 | | | |
| | di-functional | | ethylene oxide adduct bisphenol A diacrylate | 424 | <3 acrylate functional groups | | | | | 10 | 0.5 | |
| | hexa-functional | a2 | dipentaerythritol hexaacrylate | 547 | varnish component | 24 | 24 | 24 | 24 | 24 | 24 | 24 |
| Pigment (C) | | | phthalocyanine blue (Lionol Blue FG7330) | — | | 20 | 20 | 20 | 20 | 20 | 20 | 20 |
| Resin | | | diallyl phthalate resin (DAISO DAP A) | — | varnish component | 16 | 16 | 16 | 16 | 16 | 16 | 16 |
| Extender Pigment | | | talc (Hi-Filler #5000PJ) | — | | 0.8 | 0.8 | 0.9 | 0.9 | 0.9 | 0.9 | 0.9 |

TABLE 4b-continued

Formulations of comparative actinic ray-curable offset ink compositions (cyan)

| Polymerization Inhibitor | hydroquinone (hydroquinone) | — | Includes varnish component | 0.1 | 0.1 | 0.1 | 0.1 | 0.1 | 0.1 | 0.1 |
|---|---|---|---|---|---|---|---|---|---|---|
| Other additive | polyethylene wax (CERAFLOUR 991) | — | | 1 | 1 | 3 | 3 | 3 | 3 | 3 |
| | Total | | | 100 | 100 | 100 | 100 | 100 | 100 | 100 |
| | Low migration characteristics | | metal halide lamp irradiation | x | x | x | x | x | x | x |
| | | | high-pressure mercury lamp irradiation | x | x | x | x | x | x | x |
| | Curing rate | | metal halide lamp irradiation | ○ | ○ | ○ | ○ | ○ | ○ | ○ |
| | | | high-pressure mercury lamp irradiation | ○ | ○ | ○ | ○ | ○ | ○ | ○ |
| | Adhesion | | metal halide lamp irradiation | ○ | ○ | ○ | ○ | ○ | ○ | ○ |
| | | | high-pressure mercury lamp irradiation | ○ | ○ | ○ | ○ | ○ | ○ | ○ |

| | | | | Weight-average molecular weight | Remarks | Comparative Example | | | | | |
|---|---|---|---|---|---|---|---|---|---|---|---|
| | Classification | | Chemical name | | | 26 | 27 | 28 | 29 | 30 | 31 |
| Photopolymerization initiator (B) | Acylphosphine oxide compound | b1 | bis(2,4,6-trimethyl-benzoyl)-phenyl-phosphine oxide | 419 | b1-1 | | | | 3 | 3 | 3 |
| | | | 2,4,6-trimethyl-benzoyl-diphenyl-phosphine oxide | 348 | b1 | | | | | | |
| | α-amino-alkylphenone compound | b2 | 2-(dimethylamino)-1-(4-morpholino-phenyl)-2-benzyl-1-butanone | 367 | b2 | 3 | 3 | 3 | | 3 | 3 |
| | | | 2-(dimethylamino)-2-(4-methylbenzyl)-1-(4-morpholino-phenyl)-butan-1-one | 381 | b2 | | | | | | |
| | | | 2-methyl-1-[4-(methylthio)phenyl]-2-morpholino-propan-1-one | 279 | <MW300 | | | | | | |
| | α-hydroxy-alkylphenone compound | b3 | oligo{2-hydroxy-2-methyl-1-[4-(1-methylvinyl)phenyl]propanone} | 409 | b3 | 3 | 3 | 3 | 3 | | 3 |
| | | | 2-hydroxy-1-[4-[4-(2-hydroxy-2-methyl-propionyl)-benzyl]-phenyl]-2-methylpropan-1-one | 340 | b3 | | | | | | |
| | | | 1-hydroxycyclohexyl phenyl ketone | 204 | <MW300 | | | | | | |
| | thioxanthone compound | Sensitizer | 2,4-diethylthio-xanthone | 268 | | | 0.5 | | | | |
| | amino compound | | ethyl 4-(dimethyl-amino)benzoate | 254 | | | 3 | 0.5 | | | |
| Acrylate compound (A) | hexa-functional | a2 | dipentaerythritol hexaacrylate | 547 | | 17 | 17 | 17 | 17 | 17 | 27 |
| | tetra-functional | a1 | ditrimethylolpropane tetraacrylate | 482 | | 10 | 10 | 10 | 10 | 10 | |
| | tetra-functional | a1 | ethylene oxide-modified penta-erythritol tetraacrylate | 528 | | | | | | | |
| | tetra-functional | a1 | propylene oxide-modified penta-erythritol tetraacrylate | 584 | | | | | | | |
| | tri-functional | a1 | ethylene oxide-modified trimethylol-propane triacrylate | 428 | | | | | | | |
| | tri-functional | a1 | propylene oxide-modified trimethylol-propane triacrylate | 470 | | | | | | | |

TABLE 4b-continued

Formulations of comparative actinic ray-curable offset ink compositions (cyan)

| | | | | | | | | | | | | |
|---|---|---|---|---|---|---|---|---|---|---|---|---|
| | tri-functional | a1 | propylene oxide-modified glycerol triacrylate | 428 | | | | | | | | |
| | tri-functional | | trimethylolpropane triacrylate | 296 | <MW400 | | | | | | | |
| | di-functional | | ethylene oxide adduct bisphenol A diacrylate | 424 | <3 acrylate functional groups | | | | | | | |
| | hexa-functional | a2 | dipentaerythritol hexaacrylate | 547 | varnish component | 24 | 24 | 24 | 24 | 24 | 24 |
| Pigment (C) | | | phthalocyanine blue (Lionol Blue FG7330) | — | | 20 | 20 | 20 | 20 | 20 | 20 |
| Resin | | | diallyl phthalate resin (DAISO DAP A) | — | varnish component | 16 | 16 | 16 | 16 | 16 | 16 |
| Extender Pigment | | | talc (Hi-Filler #5000PJ) | — | | 3.4 | 0.9 | 3.4 | 3.9 | 3.9 | 0.9 |
| Polymerization Inhibitor | | | hydroquinone (hydroquinone) | — | Includes varnish component | 0.1 | 0.1 | 0.1 | 0.1 | 0.1 | 0.1 |
| Other additive | | | polyethylene wax (CERAFLOUR 991) | — | | 3 | 3 | 3 | 3 | 3 | 3 |
| | | | Total | | | 100 | 100 | 100 | 100 | 100 | 100 |
| | | | Low migration characteristics | | metal halide lamp irradiation | x | x | x | ○ | ○ | ○ |
| | | | | | high-pressure mercury lamp irradiation | x | x | x | ○ | ○ | ○ |
| | | | Curing rate | | metal halide lamp irradiation | Δ | ○ | Δ | x | x | ○ |
| | | | | | high-pressure mercury lamp irradiation | Δ | ○ | Δ | x | x | ○ |
| | | | Adhesion | | metal halide lamp irradiation | ○ | ○ | ○ | ○ | ○ | x |
| | | | | | high-pressure mercury lamp irradiation | ○ | ○ | ○ | ○ | ○ | x |

TABLE 5a

Formulations of comparative actinic ray-curable offset ink compositions (black)

| Classification | | | Chemical name | Weight-average molecular weight | Remarks | Example 32 | 33 | 34 | 35 | 36 | 37 | 38 | 39 | 40 |
|---|---|---|---|---|---|---|---|---|---|---|---|---|---|---|
| Photopolymerization initiator (B) | Acylphosphine oxide compound | b1 | bis(2,4,6-trimethyl-benzoyl)-phenyl-phosphine oxide | 419 | b1-1 | 3 | 3 | 3 | | | | 3 | 3 | 3 |
| | | | 2,4,6-trimethyl-benzoyl-diphenyl-phosphine oxide | 348 | b1 | | | | 3 | 3 | 3 | | | |
| | α-amino-alkylphenone compound | b2 | 2-(dimethylamino)-1-(4-morpholino-phenyl)-2-benzyl-1-butanone | 367 | b2 | 3 | 3 | 3 | 3 | 3 | 3 | | 3 | 3 |
| | | | 2-methyl-1-[4-(methylthio)phenyl]-2-morpholino-propan-1-one | 279 | <MW300 | | | | | | | 3 | 0.5 | |
| | α-hydroxy-alkylphenone compound | b3 | oligo{2-hydroxy-2-methyl-1-[4-(1-methylvinyl)phenyl]propanone} | 409 | b3 | 3 | 3 | 3 | 3 | 3 | 3 | 3 | 3 | |
| | | | 1-hydroxycyclohexyl phenyl ketone | 204 | <MW300 | | | | | | | | | 3 |
| | thioxanthone compound | sensitizer | 2,4-diethylthioxanthone | 268 | | 1 | | 0.5 | 1 | | 0.5 | | | |
| | amino compound | | ethyl 4-(dimethylamino)benzoate | 254 | | | 1 | 0.5 | | 1 | 0.5 | | | |
| | | | 4,4'-diethylaminobenzophenone | 325 | | | | | | | | | | |

TABLE 5a-continued

Formulations of comparative actinic ray-curable offset ink compositions (black)

| Acrylate compound (A) | hexa-functional | a2 | dipentaerythritol hexaacrylate | 547 | | 17 | 17 | 17 | 17 | 17 | 17 | 17 | 17 | 17 |
|---|---|---|---|---|---|---|---|---|---|---|---|---|---|---|
| | tetra-functional | a1 | ditrimethylolpropane tetraacrylate | 482 | | 10 | 10 | 10 | 10 | 10 | 10 | 10 | 10 | 10 |
| | tetra-functional | a1 | ethylene oxide-modified penta-erythritol tetraacrylate | 528 | | | | | | | | | | |
| | tetra-functional | a1 | propylene oxide-modified penta-erythritol tetraacrylate | 584 | | | | | | | | | | |
| | tri-functional | a1 | ethylene oxide-modified trimethylol-propane triacrylate | 428 | | | | | | | | | | |
| | tri-functional | a1 | propylene oxide-modified trimethylol-propane triacrylate | 470 | | | | | | | | | | |
| | tri-functional | a1 | propylene oxide-modified glycerol triacrylate | 428 | | | | | | | | | | |
| | tri-functional | | trimethylolpropane triacrylate | 296 | <MW400 | | | | | | | | | |
| | di-functional | | ethylene oxide adduct bisphenol A diacrylate | 424 | <3 acrylate functional groups | | | | | | | | | |
| | hexa-functional | a2 | dipentaerythritol hexaacrylate | 547 | varnish component | 24 | 24 | 24 | 24 | 24 | 24 | 24 | 24 | 24 |
| | tetra-functional | a1 | ditrimethylolpropane tetraacrylate | 482 | varnish component | | | | | | | | | |
| Pigment (C) | | | carbon black (Mitsubishi Carbon MA-11) | — | | 20 | 20 | 20 | 20 | 20 | 20 | 20 | 20 | 20 |
| Resin | | | diallyl phthalate resin (DAISO DAP A) | — | varnish component | 16 | 16 | 16 | 16 | 16 | 16 | 16 | 16 | 16 |
| Extender Pigment | | | talc (Hi-Filler #5000PJ) | — | | 0.9 | 0.9 | 0.9 | 0.9 | 0.9 | 0.9 | 0.9 | 0.9 | 0.9 |
| Polymerization Inhibitor | | | hydroquinone (hydroquinone) | — | Includes varnish component | 0.1 | 0.1 | 0.1 | 0.1 | 0.1 | 0.1 | 0.1 | 0.1 | 0.1 |
| Other additive | | | polyethylene wax (CERAFLOUR 991) | — | | 2 | 2 | 2 | 3 | 2 | 2 | 3 | 2.5 | 3 |
| | Total | | | | | 100 | 100 | 100 | 100 | 100 | 100 | 100 | 100 | 100 |
| | Low migration characteristics | | | | metal halide lamp irradiation | x | x | x | x | x | x | x | x | x |
| | | | | | high-pressure mercury lamp irradiation | x | x | x | x | x | x | x | x | x |
| | Curing rate | | | | metal halide lamp irradiation | ○ | ○ | ○ | ○ | ○ | ○ | ○ | ○ | ○ |
| | | | | | high-pressure mercury lamp irradiation | ○ | ○ | ○ | ○ | ○ | ○ | ○ | ○ | ○ |
| | Adhesion | | | | metal halide lamp irradiation | ○ | ○ | ○ | ○ | ○ | ○ | ○ | ○ | ○ |
| | | | | | high-pressure mercury lamp irradiation | ○ | ○ | ○ | ○ | ○ | ○ | ○ | ○ | ○ |

| | | | | Weight-average molecular | | | | | Example | | | | | |
|---|---|---|---|---|---|---|---|---|---|---|---|---|---|---|
| | Classification | | Chemical name | weight | Remarks | 41 | 42 | 43 | 44 | 45 | 46 | 47 | 48 | 49 |
| Photo-polymerization initiator (B) | Acyl-phosphine oxide compound | b1 | bis(2,4,6-trimethyl-benzoyl)-phenyl-phosphine oxide | 419 | b1-1 | 3 | | | | | | | | |
| | | | 2,4,6-trimethyl-benzoyl-diphenyl-phosphine oxide | 348 | b1 | | 3 | 3 | 3 | 3 | | | | |
| | α-amino-alkylphenone compound | b2 | 2-(dimethylamino)-1-(4-morpholino-phenyl)-2-benzyl-1-butanone | 367 | b2 | 3 | | 3 | 3 | 3 | 3 | 5 | 3 | 5 |
| | | | 2-methyl-1-[4-(methylthio)phe-nyl]-2-morpholino-propan-1-one | 279 | <MW300 | | 3 | 0.5 | | | | | | |

TABLE 5a-continued

Formulations of comparative actinic ray-curable offset ink compositions (black)

| Category | Subtype | Code | Compound | MW | Notes | | | | | | | | | |
|---|---|---|---|---|---|---|---|---|---|---|---|---|---|---|
| | α-hydroxy-alkylphenone compound | b3 | oligo{2-hydroxy-2-methyl-1-[4-(1-methylvinyl)phenyl]propanone} | 409 | b3 | 3 | 3 | 3 | | 3 | 3 | 3 | 5 | 5 |
| | | | 1-hydroxycyclohexyl phenyl ketone | 204 | <MW300 | 0.5 | | | 3 | 0.5 | | | | |
| | thioxanthone compound | sensitizer | 2,4-diethylthioxanthone | 268 | | | | | | | | | | |
| | amino compound | | ethyl 4-(dimethylamino)benzoate | 254 | | | | | | | | | | |
| | | | 4,4'-diethylaminobenzophenone | 325 | | | | | | | | | | |
| Acrylate compound (A) | hexa-functional | a2 | dipentaerythritol hexaacrylate | 547 | | 17 | 17 | 17 | 17 | 17 | 17 | 17 | 17 | 17 |
| | tetra-functional | a1 | ditrimethylolpropane tetraacrylate | 482 | | 10 | 10 | 10 | 10 | 10 | 10 | 10 | 10 | 10 |
| | tetra-functional | a1 | ethylene oxide-modified pentaerythritol tetraacrylate | 528 | | | | | | | | | | |
| | tetra-functional | a1 | propylene oxide-modified pentaerythritol tetraacrylate | 584 | | | | | | | | | | |
| | tri-functional | a1 | ethylene oxide-modified trimethylolpropane triacrylate | 428 | | | | | | | | | | |
| | tri-functional | a1 | propylene oxide-modified trimethylolpropane triacrylate | 470 | | | | | | | | | | |
| | tri-functional | a1 | propylene oxide-modified glycerol triacrylate | 428 | | | | | | | | | | |
| | tri-functional | | trimethylolpropane triacrylate | 296 | <MW400 | | | | | | | | | |
| | di-functional | | ethylene oxide adduct bisphenol A diacrylate | 424 | <3 acrylate functional groups | | | | | | | | | |
| | hexa-functional | a2 | dipentaerythritol hexaacrylate | 547 | varnish component | 24 | 24 | 24 | 24 | 24 | 24 | 24 | 24 | 24 |
| | tetra-functional | a1 | ditrimethylolpropane tetraacrylate | 482 | varnish component | | | | | | | | | |
| Pigment (C) | carbon black (Mitsubishi Carbon MA-11) | | | — | | 20 | 20 | 20 | 20 | 20 | 20 | 20 | 20 | 20 |
| Resin | diallyl phthalate resin (DAISO DAP A) | | | — | varnish component | 16 | 16 | 16 | 16 | 16 | 16 | 16 | 16 | 16 |
| Extender Pigment | talc (Hi-Filler #5000PJ) | | | — | | 0.9 | 0.9 | 0.9 | 0.9 | 0.9 | 3.9 | 1.9 | 1.9 | 0.9 |
| Polymerization Inhibitor | hydroquinone (hydroquinone) | | | — | Includes varnish component | 0.1 | 0.1 | 0.1 | 0.1 | 0.1 | 0.1 | 0.1 | 0.1 | 0.1 |
| Other additive | polyethylene wax (CERAFLOUR 991) | | | — | | 2.5 | 3 | 2.5 | 3 | 2.5 | 3 | 3 | 3 | 2 |
| | Total | | | | | 100 | 100 | 100 | 100 | 100 | 100 | 100 | 100 | 100 |
| Low migration characteristics | | | metal halide lamp irradiation | | | x | x | x | x | x | ○ | ○ | ○ | ○ |
| | | | high-pressure mercury lamp irradiation | | | x | x | x | x | x | ○ | ○ | ○ | ○ |
| Curing rate | | | metal halide lamp irradiation | | | ○ | ○ | ○ | ○ | ○ | x | x | x | x |
| | | | high-pressure mercury lamp irradiation | | | ○ | ○ | ○ | ○ | ○ | x | x | x | x |
| Adhesion | | | metal halide lamp irradiation | | | ○ | ○ | ○ | ○ | ○ | ○ | ○ | ○ | ○ |
| | | | high-pressure mercury lamp irradiation | | | ○ | ○ | ○ | ○ | ○ | ○ | ○ | ○ | ○ |

TABLE 5b

Formulations of comparative actinic ray-curable offset ink compositions (black)

| | Classification | | Chemical name | Weight-average molecular weight | Remarks | Example 50 | 51 | 52 | 53 | 54 | 55 | 56 | 57 |
|---|---|---|---|---|---|---|---|---|---|---|---|---|---|
| Photo-polymer-ization initiator (B) | Acyl-phosphine oxide compound | b1 | bis(2,4,6-trimethyl-benzoyl)-phenyl-phosphine oxide | 419 | b1-1 | 5.1 | | 3 | 3 | 3 | 3 | | |
| | | | 2,4,6-trimethyl-benzoyl-diphenyl-phosphine oxide | 348 | b1 | | 5.1 | | | | | | |
| | α-amino-alkylphenone compound | b2 | 2-(dimethylamino)-1-(4-morpholino-phenyl)-2-benzyl-1-butanone | 367 | b2 | 3 | 3 | 3 | 3 | 3 | 3 | 3 | 3 |
| | | | 2-methyl-1-[4-(methylthio)phe-nyl]-2-morpholino-propan-1-one | 279 | <MW300 | | | | | | | | |
| | α-hydroxy-alkylphenone compound | b3 | oligo{2-hydroxy-2-methyl-1-[4-(1-methylvinyl)phe-nyl]propanone} | 409 | b3 | 3 | 3 | 3 | 3 | 3 | 3 | 3 | 3 |
| | | | 1-hydroxycyclohexyl phenyl ketone | 204 | <MW300 | | | | | | | | |
| | thioxanthone compound | sensi-tizer | 2,4-diethylthio-xanthone | 268 | | | | | | | | 3 | 0.5 |
| | amino compound | | ethyl 4-(dimethyl-amino)benzoate | 254 | | | | | | | | | |
| | | | 4,4'-diethylamino-benzophenone | 325 | | | | | | | | | |
| Acrylate compound (A) | hexa-functional | a2 | dipentaerythritol hexaacrylate | 547 | | 17 | 17 | 17 | 17 | 17 | 17 | 17 | 17 |
| | tetra-functional | a1 | ditrimethylolpropane tetraacrylate | 482 | | 10 | 10 | | 9.5 | | 9.5 | 10 | 10 |
| | tetra-functional | a1 | ethylene oxide-modified penta-erythritol tetraacrylate | 528 | | | | | | | | | |
| | tetra-functional | a1 | propylene oxide-modified penta-erythritol tetraacrylate | 584 | | | | | | | | | |
| | tri-functional | a1 | ethylene oxide-modified trimethylol-propane triacrylate | 428 | | | | | | | | | |
| | tri-functional | a1 | propylene oxide-modified trimethylol-propane triacrylate | 470 | | | | | | | | | |
| | tri-functional | a1 | propylene oxide-modified glycerol triacrylate | 428 | | | | | | | | | |
| | tri-functional | | trimethylolpropane triacrylate | 296 | <MW400 | | | | 10 | 0.5 | | | |
| | di-functional | | ethylene oxide adduct bisphenol A diacrylate | 424 | <3 acrylate functional groups | | | | | | 10 | 0.5 | |
| | hexa-functional | a2 | dipentaerythritol hexaacrylate | 547 | varnish component | 24 | 24 | 24 | 24 | 24 | 24 | 24 | 24 |
| | tetra-functional | a1 | ditrimethylolpropane tetraacrylate | 482 | varnish component | | | | | | | | |
| Pigment (C) | | | carbon black (Mitsubishi Carbon MA-11) | — | | 20 | 20 | 20 | 20 | 20 | 20 | 20 | 20 |
| Resin | | | diallyl phthalate resin (DAISO DAP A) | — | varnish component | 16 | 16 | 16 | 16 | 16 | 16 | 16 | 16 |
| Extender Pigment | | | talc (Hi-Filler #5000PJ) | — | | 0.8 | 0.8 | 0.9 | 0.9 | 0.9 | 0.9 | 0.9 | 3.4 |
| Polymer-ization Inhibitor | | | hydroquinone (hydroquinone) | — | Includes varnish component | 0.1 | 0.1 | 0.1 | 0.1 | 0.1 | 0.1 | 0.1 | 0.1 |
| Other additive | | | polyethylene wax (CERAFLOUR 991) | — | | 1 | 1 | 3 | 3 | 3 | 3 | 3 | 3 |
| | Total | | | | | 100 | 100 | 100 | 100 | 100 | 100 | 100 | 100 |
| | Low migration characteristics | | | | metal halide lamp irradiation | x | x | x | x | x | x | x | x |
| | | | | | high-pressure mercury lamp irradiation | x | x | x | x | x | x | x | x |

TABLE 5b-continued

Formulations of comparative actinic ray-curable offset ink compositions (black)

| | | | | | | | | | | |
|---|---|---|---|---|---|---|---|---|---|---|
| Curing rate | | metal halide lamp irradiation | ○ | ○ | ○ | ○ | ○ | ○ | ○ | Δ |
| | | high-pressure mercury lamp irradiation | ○ | ○ | ○ | ○ | ○ | ○ | ○ | Δ |
| Adhesion | | metal halide lamp irradiation | ○ | ○ | ○ | ○ | ○ | ○ | ○ | ○ |
| | | high-pressure mercury lamp irradiation | ○ | ○ | ○ | ○ | ○ | ○ | ○ | ○ |

| | | | | Weight-average molecular | | Example | | | | | | |
|---|---|---|---|---|---|---|---|---|---|---|---|---|
| Classification | | | Chemical name | weight | Remarks | 58 | 59 | 60 | 61 | 62 | 63 | 64 |
| Photo-polymerization initiator (B) | Acyl-phosphine oxide compound | b1 | bis(2,4,6-trimethyl-benzoyl)-phenyl-phosphine oxide | 419 | b1-1 | | | 3 | 3 | 3 | 3 | 5 |
| | | | 2,4,6-trimethyl-benzoyl-diphenyl-phosphine oxide | 348 | b1 | | | | | | | |
| | α-amino-alkylphenone compound | b2 | 2-(dimethylamino)-1-(4-morpholino-phenyl)-2-benzyl-1-butanone | 367 | b2 | 3 | 3 | | 3 | 3 | 3 | 3 |
| | | | 2-methyl-1-[4-(methylthio)phe-nyl]-2-morpholino-propan-1-one | 279 | <MW300 | | | | | | | |
| | α-hydroxy-alkylphenone compound | b3 | oligo{2-hydroxy-2-methyl-1-[4-(1-methylvinyl)phe-nyl]propanone} | 409 | b3 | 3 | 3 | 3 | | 3 | | 3 |
| | | | 1-hydroxycyclohexyl phenyl ketone | 204 | <MW300 | | | | | | | |
| | thioxanthone compound | sensi-tizer | 2,4-diethylthio-xanthone | 268 | | | | | | | | |
| | amino compound | | ethyl 4-(dimethyl-amino)benzoate | 254 | | 3 | 0.5 | | | | | |
| | | | 4,4'-diethylamino-benzophenone | 325 | | | | | | | 3 | |
| Acrylate compound (A) | hexa-functional | a2 | dipentaerythritol hexaacrylate | 547 | | 17 | 17 | 17 | 17 | 27 | 17 | |
| | tetra-functional | a1 | ditrimethylolpropane tetraacrylate | 482 | | 10 | 10 | 10 | 10 | | 10 | 25 |
| | tetra-functional | a1 | ethylene oxide-modified penta-erythritol tetraacrylate | 528 | | | | | | | | |
| | tetra-functional | a1 | propylene oxide-modified penta-erythritol tetraacrylate | 584 | | | | | | | | |
| | tri-functional | a1 | ethylene oxide-modified trimethylol-propane triacrylate | 428 | | | | | | | | |
| | tri-functional | a1 | propylene oxide-modified trimethylol-propane triacrylate | 470 | | | | | | | | |
| | tri-functional | a1 | propylene oxide-modified glycerol triacrylate | 428 | | | | | | | | |
| | tri-functional | | trimethylolpropane triacrylate | 296 | <MW400 | | | | | | | |
| | di-functional | | ethylene oxide adduct bisphenol A diacrylate | 424 | <3 acrylate functional groups | | | | | | | |
| | hexa-functional | a2 | dipentaerythritol hexaacrylate | 547 | varnish component | 24 | 24 | 24 | 24 | 24 | 24 | |
| | tetra-functional | a1 | ditrimethylolpropane tetraacrylate | 482 | varnish component | | | | | | | 24 |
| Pigment (C) | | | carbon black (Mitsubishi Carbon MA-11) | — | | 20 | 20 | 20 | 20 | 20 | 20 | 20 |
| Resin | | | diallyl phthalate resin (DAISO DAP A) | — | varnish component | 16 | 16 | 16 | 16 | 16 | 16 | 16 |
| Extender Pigment | | | talc (Hi-Filler #5000PJ) | — | | 0.9 | 3.4 | 3.9 | 3.9 | 0.9 | 0.9 | 0.9 |

TABLE 5b-continued

Formulations of comparative actinic ray-curable offset ink compositions (black)

| | | | | | | | | | | |
|---|---|---|---|---|---|---|---|---|---|---|
| Polymerization Inhibitor | hydroquinone (hydroquinone) | — | Includes varnish component | 0.1 | 0.1 | 0.1 | 0.1 | 0.1 | 0.1 | 0.1 |
| Other additive | polyethylene wax (CERAFLOUR 991) | — | | 3 | 3 | 3 | 3 | 3 | 3 | 3 |
| | Total | | | 100 | 100 | 100 | 100 | 100 | 100 | 100 |
| | Low migration characteristics | | metal halide lamp irradiation | x | x | ○ | ○ | ○ | x | ○ |
| | | | high-pressure mercury lamp irradiation | x | x | ○ | ○ | ○ | x | ○ |
| | Curing rate | | metal halide lamp irradiation | ○ | Δ | x | x | ○ | ○ | Δ |
| | | | high-pressure mercury lamp irradiation | ○ | Δ | x | x | ○ | ○ | x |
| | Adhesion | | metal halide lamp irradiation | ○ | ○ | ○ | ○ | x | ○ | Δ |
| | | | high-pressure mercury lamp irradiation | ○ | ○ | ○ | ○ | x | ○ | x |

Each of the obtained actinic ray-curable offset ink compositions of Examples 1 to 41 and Comparative Examples 1 to 64 was printed onto a milk carton sheet, namely a PE-coated paper (Tohei Pak Carton, manufactured by Hokuetsu Kishu Paper Co., Ltd.), at 0.0002 g/cm² using an RI tester, and the "curability" and "adhesion" were evaluated. The results of these evaluations are also shown in Tables 2 to 5. An RI tester is a testing device used for applying an ink to a paper or film, and is able to adjust the amount of ink transferred and the printing pressure.

<Evaluation of Curability>

Using a metal halide lamp (manufactured by Eye Graphics Co., Ltd.) or a high-pressure mercury lamp (manufactured by Eye Graphics Co., Ltd.) as an irradiation device, ultraviolet irradiation was performed under conditions including an irradiation output of 160 W/cm, an irradiation distance of 10 mm, and a conveyor speed of 90 m/minute, the printed surface was then rubbed with a cotton cloth, and the presence or absence of color on the cotton cloth upon visual inspection was used to evaluate the "curability" against the following evaluation criteria.

Under the above irradiation output and irradiation distance conditions, the irradiation dose at a conveyor speed of 90 m/minute can be considered to satisfy the standard level of irradiation in a production process for a printed packaging item by an offset sheet-fed printing press that performs printing using a plurality of high-pressure mercury lamps and/or metal halide lamps.

(Evaluation Criteria)

○: No coloring of cloth, suitable for practical application

Δ: Very slight coloring of cloth, but suitable for practical application x: Significant coloring of cloth, not suitable for practical application <Evaluation of Adhesion>

Using a metal halide lamp (manufactured by Eye Graphics Co., Ltd.) or a high-pressure mercury lamp (manufactured by Eye Graphics Co., Ltd.) as an irradiation device, ultraviolet irradiation was performed under conditions including an irradiation output of 160 W/cm and an irradiation distance of 10 mm, at a conveyor speed (m/minute) at which no coloring of a cotton cloth could be detected visually when the cloth was rubbed against the printed surface. After standing for 24 hours, a cellophane tape (manufactured by Nichiban Co., Ltd.) was stuck to the printed item and then peeled off at a peel angle of 90°, and the presence or absence of peeling of the ink coating film was evaluated. The evaluation criteria were based on the ratio of the surface area of peeled ink coating film relative to the surface area of tape contact (5: no peeling, 4: less than 10% peeling, 3: less than 20% peeling, 2: less than 30% peeling, 1: at least 30% peeling), and the practical applicability was evaluated in the following manner.

(Evaluation Criteria)

○: (5: no peeling), suitable for practical application

Δ: (4: less than 10% peeling, 3: less than 20% peeling, 2: less than 30% peeling), suitable for practical application x: (1: at least 30% peeling), not suitable for practical application <Evaluation of Migration>

Each of the actinic ray-curable offset ink compositions of Examples 1 to 41 and Comparative Examples 1 to 64 was printed at 0.0002 g/cm² onto 100 cm² samples of each of the following substrates using an RI tester, ultraviolet irradiation was performed using a metal halide lamp (manufactured by Eye Graphics Co., Ltd.) under conditions including an irradiation output of 160 W/cm, an irradiation distance of 10 mm, and a conveyor speed of 80 m/minute, a PP film (Sheedom Aqua, thickness: 0.2 mm, manufactured by Sheedom Co., Ltd.) having an equivalent area was placed on the printed substrate, with a load of 0.02 kg/cm², and was left for 10 days at 25° C. and 50% humidity. Subsequently, the PP film was immersed for 10 days in 100 ml of ethanol in an environment at 60° C. and 50% humidity, and the thus obtained ethanol was then analyzed using an LC-MS (high performance liquid chromatography-mass spectrometer) manufactured by Waters Corporation. If the concentrations of the (meth)acrylate compounds and the photopolymerization initiators in the ethanol were each less than 100 ppb, then the composition was deemed to have low migration characteristics (○), whereas if a concentration of 100 ppb or greater was detected, the composition was deemed to lack low migration characteristics (x).

(Evaluation Criteria)

○: detected amounts of less than 100 ppb, good low migration characteristics x: detected amounts of 100 ppb or greater, poor low migration characteristics Substrates: commercial printing papers (art paper, coated paper, woodfree paper, matt coated paper), thick cardboard sheets (cardboard, milk carton sheet, Kent paper, corrugated cardboard), aluminum-coated paper, and synthetic paper (Yupo paper), each having a thickness of not more than 2.0 mm.

INDUSTRIAL APPLICABILITY

Good suppression of outward migration from the printed item for both the (meth)acrylate monomers and the photopolymerization initiators can be obtained, and the level of safety demanded in the current market environment for inks for foodstuff and pharmaceutical packaging can be achieved.

The invention claimed is:
1. An actinic ray-curable offset ink composition comprising:
  a (meth)acrylate compound (A),
  a photopolymerization initiator (B), and
  a pigment (C), and
  satisfying conditions (1) to (8) described below:
  (1) the actinic ray-curable offset ink composition contains no photosensitizer,
  (2) the photopolymerization initiator (B) comprises an acylphosphine oxide compound (b1), an α-aminoalkylphenone (b2), and an α-hydroxyalkylphenone (b3),
  (3) a molar extinction coefficient of the α-aminoalkylphenone (b2) is at least 5,000 (l/mol·cm) within a light wavelength region from 350 to 400 nm and at least 40,000 (l/mol·cm) within a light wavelength region from 300 to 350 nm, and a molar extinction coefficient of the α-hydroxyalkylphenone (b3) is at least 40,000 (l/mol·cm) within a light wavelength region from 250 to 300 nm,
  (4) the photopolymerization initiator (B) is composed only of compounds having a weight-average molecular weight of 300 to 2,000,
  (5) a total weight of the actinic ray-curable offset ink composition contains not more than 5% by weight of the acylphosphine oxide compound (b1),
  (6) the (meth)acrylate compound (A) is composed only of compounds having 3 or more acrylate functional groups per molecule and having a weight-average molecular weight of 400 to 2,000,
  (7) the (meth)acrylate compound (A) comprises at least one compound (a1) selected from the group consisting of:
  ditrimethylolpropane tetraacrylate or ditrimethylolpropane triacrylate,
  ethylene oxide-modified pentaerythritol tetraacrylate or ethylene oxide-modified pentaerythritol triacrylate,
  propylene oxide-modified pentaerythritol tetraacrylate or propylene oxide-modified pentaerythritol triacrylate,
  ethylene oxide-modified trimethylolpropane triacrylate,
  propylene oxide-modified trimethylolpropane triacrylate, and
  propylene oxide-modified glycerol triacrylate, and
  (8) the (mcth)acrylate compound (A) comprises dipentaerythritol hexaacrylate and/or dipentaerythritol pentaacrylate (a2).

2. The actinic ray-curable offset ink composition according to claim 1, wherein a total weight of the actinic ray-curable offset ink composition comprises:
  10 to 70% by weight of the (meth)acrylate compound (A),
  0.1 to 30% by weight of the photopolymerization initiator (B), and
  1 to 60% by weight of the pigment (C).

3. The actinic ray-curable offset ink composition according to claim 1, wherein the acylphosphine oxide compound (b1) comprises bis(2,4,6-trimethylbenzoyl)-phenylphosphine oxide (b1-1).

4. The actinic ray-curable offset ink composition according to claim 1, wherein within a total weight of the actinic ray-curable offset ink composition, the photopolymerization initiator (B) comprises:
  not more than 5% by weight of the α-aminoalkylphenone (b2), and
  not more than 5% by weight of the α-hydroxyalkylphenone (b3).

5. The actinic ray-curable offset ink composition according to claim 4, wherein within a total weight of the actinic ray-curable offset ink composition, the (meth)acrylate compound (A) comprises:
  more than 0% by weight but not more than 50% by weight of dipentaerythritol hexaacrylate and/or dipentaerythritol pentaacrylate (a2).

6. The actinic ray-curable offset ink composition according to claim 1, wherein when the actinic ray-curable offset ink composition is printed onto a 100 cm$^2$ sample of any of substrates (D) described below at 0.0002 g/cm$^2$, the printed substrate is subjected to ultraviolet irradiation using a metal halide lamp under conditions including an irradiation output of 160 W/cm, an irradiation distance of 10 mm and a conveyor speed of 80 m/minute, a PP film (thickness: 0.2 mm) of the same surface area is then overlaid on the substrate, a load of 0.02 kg/cm$^2$ is applied, and following standing for 10 days in an environment at 25° C. and 50% humidity, the PP film is immersed for 10 days in 100 ml of ethanol in an environment at 60° C. and 50% humidity, the (meth)acrylate compound (A) and the photopolymerization initiator (B) exist in the ethanol at concentrations of less than 100 ppb:
  substrates (D): commercial printing papers (art paper, coated paper, woodfree paper, matt coated paper), thick cardboard sheets (cardboard, milk carton sheet, Kent paper, corrugated cardboard), aluminum-coated paper, and synthetic paper (Yupo paper), each having a thickness of not more than 2.0 mm.

7. An offset ink multi-layer printed item, obtained by layering the actinic ray-curable offset ink composition according to claim 1 to form a multi-layer on a substrate (D).

* * * * *